United States Patent
Garg et al.

(10) Patent No.: US 11,049,142 B2
(45) Date of Patent: Jun. 29, 2021

(54) SMART GEO-FENCING USING LOCATION SENSITIVE PRODUCT AFFINITY

(71) Applicant: Adobe Inc., San Jose, CA (US)

(72) Inventors: Ankur Garg, Chandigarh (IN); Sweta Agrawal, Sirsa (IN); Shubham Agrawal, Kota (IN); Payal Bajaj, Palo Alto, CA (US); Abhishek Kedia, West Bengal (IN)

(73) Assignee: ADOBE INC., San Jose, CA (US)

( * ) Notice: Subject to any disclaimer, the term of this patent is extended or adjusted under 35 U.S.C. 154(b) by 760 days.

(21) Appl. No.: 15/434,886

(22) Filed: Feb. 16, 2017

(65) Prior Publication Data

US 2018/0232767 A1    Aug. 16, 2018

(51) Int. Cl.
*G06Q 30/02* (2012.01)
*H04W 4/021* (2018.01)

(52) U.S. Cl.
CPC ........ *G06Q 30/0261* (2013.01); *H04W 4/021* (2013.01)

(58) Field of Classification Search
None
See application file for complete search history.

(56) References Cited

U.S. PATENT DOCUMENTS

| | | | | |
|---|---|---|---|---|
| 2008/0248815 A1* | 10/2008 | Busch | ................ | G06Q 30/0261 455/456.5 |
| 2014/0242947 A1* | 8/2014 | Ali | ........................ | H04W 4/022 455/411 |
| 2015/0149542 A1* | 5/2015 | Jain | ......................... | H04L 51/32 709/204 |
| 2015/0163629 A1* | 6/2015 | Cheung | ............. | G06Q 30/0205 455/456.1 |

(Continued)

OTHER PUBLICATIONS

Grewal, Dhruv, Mobile Advertising: A frame work and research agenda,ELSEVIER, May 2016, p. 3 and 4 https://www.sciencedirect.com/science/article/pii/S1094996816300032 (Year: 2016).*

(Continued)

*Primary Examiner* — Michael W Schmucker
*Assistant Examiner* — Alfred H Tsui
(74) *Attorney, Agent, or Firm* — Kilpatrick Townsend & Stockton LLP

(57) ABSTRACT

In some embodiments, a computing system determines, based on stored user information retrieved from a mobile user device and associated with a particular user, a location-specific affinity of the particular user for a product at a particular geographical location. The location-specific affinity indicates an interest of the particular user in the product that increases when the particular user is positioned at the particular geographical location. The computing system designs a geo-fence targeted to the particular user based on the location-specific affinity, where messages are transmitted (Continued)

to the mobile user device if the particular user is within a boundary of the geo-fence. The geo-fence defines a geographical area that includes the particular geographical location and that is associated with a provider of the product. The computing system causes a telecommunication server to transmit the message to the user device when the user device is positioned within the designed geo-fence.

17 Claims, 7 Drawing Sheets

(56) References Cited

U.S. PATENT DOCUMENTS

| | | | | |
|---|---|---|---|---|
| 2015/0332325 | A1* | 11/2015 | Sharma | H04W 4/029 705/14.57 |
| 2016/0179835 | A1* | 6/2016 | Mika | G06N 20/00 706/12 |

OTHER PUBLICATIONS

T. Anagnostopoulos, C. Anagnostopoulos, S. Hadjiefthymiades, M. Kyriakakos, and A. Kalousis, "Predicting the Location of Mobile Users: A Machine Learning Approach", Proceedings of the 2009 International Conference on Pervasive Services, pp. 65-72, ACM Jul. 17, 2009.

H. Bagci and P. Karagoz, "Context-Aware Friend Recommendation for Location Based Social Networks Using Random Walk", Proceedings of the 25th International Conference Companion on World Wide Web, pp. 531-536, International World Wide Web Conferences Steering Committee, Apr. 11, 2016.

J. Bao, Y. Zheng, and M. F. Mokbel, "Location-Based and Preference-Aware Recommendation Using Sparse Geo-Social Networking Data", Proceedings of the 20th International Conference on Advances in Geographic Information Systems, pp. 199-208. ACM, Nov. 6, 2012.

U. Bareth, A. Kupper, and P. Ruppel, "Geoxmart—A Marketplace for Geofence-Based Mobile Services", Computer Software and Applications Conference (COMPSAC), 2010 IEEE 34th Annual, pp. 101-106, IEEE, Jul. 19-23, 2010.

J. Basilico and T. Hofmann, "Unifying Collaborative and Content-Based Filtering", Proceedings of the Twenty-First International Conference on Machine Learning, p. 9, ACM, Jul. 4, 2004.

T. Calin'ski and J. Harabasz, "A Dendrite Method for Cluster Analysis", Communications in Statistics-theory and Methods, vol. 3, Issue 1, pp. 1-27, Jan. 1974.

J. Choi and D. R. Bell, "Preference minorities and the internet", Journal of Marketing Research, vol. 48, No. 4, pp. 670-682, Jul. 2011.

H. Edelsbrunner, D. Kirkpatrick, and R. Seidel, "On the Shape of a Set of Points in the Plane", IEEE Transactions on Information Theory, vol. 29, No. 4, pp. 551-559, Jul. 1983.

M. Ester, H.-P. Kriegel, J. Sander, X. Xu, et al, "A Density-Based Algorithm for Discovering Clusters in Large Spatial Databases With Noise", KDD-96 Proceedings, vol. 96, pp. 226-231, 1996.

I. Lee and V. Estivill-Castro, "Polygonization of Point Clusters Through Cluster Boundary Extraction for Geographical Data Mining", Advances in Spatial Data Handling, pp. 27-40, Springer, 2002.

Q. Li, Y. Zheng, X. Xie, Y. Chen, W. Liu, and W.-Y. Ma, "Mining User Similarity Based on Location History", Proceedings of the 16th ACM Sigspatial International Conference on Advances in Geographic Information Systems, p. 34, ACM, Nov. 5, 2008.

S. Li, W. Sun, R. Song, Z. Shan, Z. Chen, and X. Zhang, "Quick Geo-Fencing Using Trajectory Partitioning and Boundary Simplification", Proceedings of the 21st ACM Sigspatial International Conference on Advances in Geographic Information Systems, pp. 580-583, ACM, Nov. 2013.

E. H.-C. Lu, V. S. Tseng, and S. Y. Philip, "Mining Cluster-Based Temporal Mobile Sequential Patterns in Location-Based Service Environments", IEEE Transactions on Knowledge and Data Engineering, vol. 23, No. 6, pp. 914-927, Jun. 2011.

W. Mathew, R. Raposo, and B. Martins, "Predicting Future Locations With Hidden Markov Models", Proceedings of the 2012 ACM Conference on Ubiquitous Computing, pp. 911-918, ACM, Sep. 2012.

A. Monreale, F. Pinelli, R. Trasarti, and F. Giannotti, "Wherenext: A Location Predictor on Trajectory Pattern Mining", Proceedings of the 15th ACM SIGKDD International Conference on Knowledge Discovery and Data Mining, pp. 637-646, ACM, Jun. 2009.

K. Partridge and B. Begole, "Activity-Based Advertising Techniques and Challenges", Proc. Workshop on Pervasive Advertising, 2009.

M. J. Pazzani and D. Billsus, "Content-Based Recommendation Systems", The Adaptive Web, pp. 325-341, Springer, 2007.

Y. Qu and J. Zhang, "Trade Area Analysis Using User Generated Mobile Location Data", Proceedings of the 22nd international conference on World Wide Web, pp. 1053-1064, ACM, Mar. 2013.

P. Resnick, N. Iacovou, M. Suchak, P. Bergstrom, and J. Riedl, "Grouplens: An Open Architecture for Collaborative Filtering of Netnews", Proceedings of the 1994 ACM Conference on Computer Supported Cooperative Work, CSCW '94, pp. 175-186, ACM, Oct. 1994.

B. Sarwar, G. Karypis, J. Konstan, and J. Riedl, "Item-Based Collaborative Filtering Recommendation Algorithms", Proceedings of the 10th International Conference on World Wide Web, WWW '01, pp. 285-295, ACM, May 2001.

C. Steinfield, "Geographic and Socially Embedded Electronic Transactions: Towards a Situated View of Business-To-Consumer and Business-To-Business E-Commerce", https://pdfs.semanticscholar.org/a60b/fdb10fe57d8620a8a8d4230b9eaa8e495491, 2004.

R. Tibshirani, G. Walther, and T. Hastie, "Estimating the Number of Clusters in a Data Set Via the Gap Statistic" Journal of the Royal Statistical Society: Series B (Statistical Methodology), vol. 63, Part 2, pp. 411-423, 2001.

G. Wang, S. Y. Schoenebeck, H. Zheng, and B. Y. Zhao, "Will Check-In for Badges: Understanding Bias and Misbehavior on Location-Based Social Networks", Tenth International AAAI Conference on Web and Social Media, 2016.

J. Wang, B. Sarwar, and N. Sundaresan, "Utilizing Related Products for Post-Purchase Recommendation in E-Commerce", Proceedings of the Fifth ACM Conference on Recommender Systems, RecSys '11, pp. 329-332, ACM, Oct. 2011.

Xiao, Y. Zheng, Q. Luo, and X. Xie, "Finding Similar Users Using Category-Based Location History", Proceedings of the 18th Sigspatial International Conference on Advances in Geographic. Information Systems, pp. 442-445, ACM, Nov. 2010.

V. W. Zheng, Y. Zheng, X. Xie, and Q. Yang, "Collaborative Location and Activity Recommendations With Gps History Data", Proceedings of the 19th International Conference on World Wide Web, pp. 1029-1038, ACM, Apr. 2010.

Zheng, Y. Chen, X. Xie, and W.-Y. Ma, "Geolife 2.0: A Location-Based Social Networking Service", 2009 Tenth International Conference on Mobile Data Management: Systems, Services and Middleware, pp. 357-358, IEEE, Feb. 2009.

Y. Zheng, L. Zhang, Z. Ma, X. Xie, and W.-Y. Ma, "Recommending Friends and Locations Based on Individual Location History" ACM Transactions on the Web (TWEB), vol. 5, Issue 1, Article 5, Feb. 2011.

Pongpaichet, Siripen, et al., "Situation Fencing: Making Geo-Fencing Personal and Dynamic", In Proceedings of the 1st ACM international workshop on Personal data meets distributed multimedia, ACM, 2013, 10 pages.

Wikipedia, "k-means clustering", https://en.wikipedia.org/wiki/K-means_clustering, edited Jul. 6, 2019, accessed Jul. 12, 2019, 12 pages.

Hennig, Christian, "Calinski-Harabasz Index", https://web.archive.org/web/20160210004923/http://artax.karlin.mff.cuni.cz/r-help/library/fpc/html/calinhara.html, Jun. 2013-Jul. 2017, 2 pages.

Wikipedia, "DBSCAN", https://en.wikipedia.org/wiki/DBSCAN, edited May 25, 2019, accessed Jul. 12, 2019, 6 pages.

Plotprojects, "Why Use Geofencing?", https://www.plotprojects.com/geofencing/, accessed Jul. 12, 2019, 6 pages.

(56) References Cited

OTHER PUBLICATIONS

Thumb Vista, "Location-Based Marketing/Geofencing Services", https://thumbvista.com/location-based-marketing-location-sms-geofencing/, 2018, accessed Jul. 12, 2019, 9 pages.

* cited by examiner

SMART GEO-FENCING USING LOCATION SENSITIVE PRODUCT AFFINITY

TECHNICAL FIELD

This disclosure involves computer-implemented methods and systems for creating geo-fences that facilitate automated and personalized messaging based on a user's location and affinity for a product.

BACKGROUND

Geo-fencing is a location-based service that allows users to receive messages if the user is physically located within a prespecified geographical boundary (i.e., a "geo-fence"). Geo-fencing facilitates transmission of location-based notifications to users (e.g., in mobile marketing strategies). Conventional geo-fencing requires that the boundaries of a geo-fence are manually determined (e.g., a retailer has to manually specify a location and a radius of area around the location to establish a geo-fence). Multiple geo-fences may be defined within an area, some of which may overlap. For example, if notifications are to be transmitted to mobile devices within a geo-fence on behalf of a certain entity, that entity (e.g., a marketer) determines a geographic area of a city (e.g., Rodeo Drive in Hollywood) and identifies key locations (e.g., retail stores) within that area to promote. The geo-fences are manually specified using a radius around each of the key locations to define the boundaries of the geo-fences. If a mobile device associated with a user enters a geo-fence, an electronic message (e.g., an advertisement, coupon, etc.) is transmitted to the user's mobile device (e.g., an advertisement or other promotional messaged related to a product offered at or near the key location).

While such conventional geo-fences directly target a large number of users based on their proximity to a location, the targeted messages are not tailored to a user's affinity (e.g., interests). For example, if a conventional geo-fence surrounds a women's athletic store, a message including an advertisement for women's shoes may be transmitted to a mobile device associated with a male shopper within the geo-fence who lacks interest in the women's shoes. The lack of personalization in the targeted message compromises the user's experience, decreasing the likelihood of the user interacting with targeted messages received in the future (e.g., by subscribing to a service, clicking on a particular message, etc.).

Furthermore, this absence of personalization increases the computing resources (e.g., processing cycles, memory, etc.) used to construct and communicate with mobile devices via these geo-fences. For example, computing resources, financial resources, or both may be expended on monitoring the geo-fences, constructing the targeted messages, and transmitting the target messages based on the volume of users entering the geo-fences, regardless of a potential recipient's affinity for the content of the message. Thus, at least some of these resources are, in effect, wasted on low-affinity recipients.

Accordingly, a system is desired to personalize the geo-fences such that target messages are limited to only those individuals within a particular geo-fence and expressing an affinity for a product corresponding to the particular geo-fence.

SUMMARY

Certain embodiments of the present disclosure involve generating personalized geo-fences that customize electronic communications with mobile devices based on a user's location and affinity to a product. For example, a computing system determines, based on stored user information retrieved from a mobile user device and associated with a particular user, a location-specific affinity of the particular user for a product at a particular geographical location. The location-specific affinity indicates an interest of the particular user in the product that increases when the particular user is positioned at the particular geographical location. The computing system designs a geo-fence targeted to the particular user based on the location-specific affinity, where messages are transmitted to the mobile user device if the particular user is within a boundary of the geo-fence. The geo-fence defines a geographical area that includes the particular geographical location and that is associated with a provider of the product. The computing system causes a telecommunication server to transmit the message to the user device when the user device is positioned within the designed geo-fence.

BRIEF DESCRIPTION OF THE DRAWINGS

These and other features, embodiments, and advantages of the present disclosure are better understood when the following Detailed Description is read with reference to the accompanying drawings.

DETAILED DESCRIPTION

Figure 1:
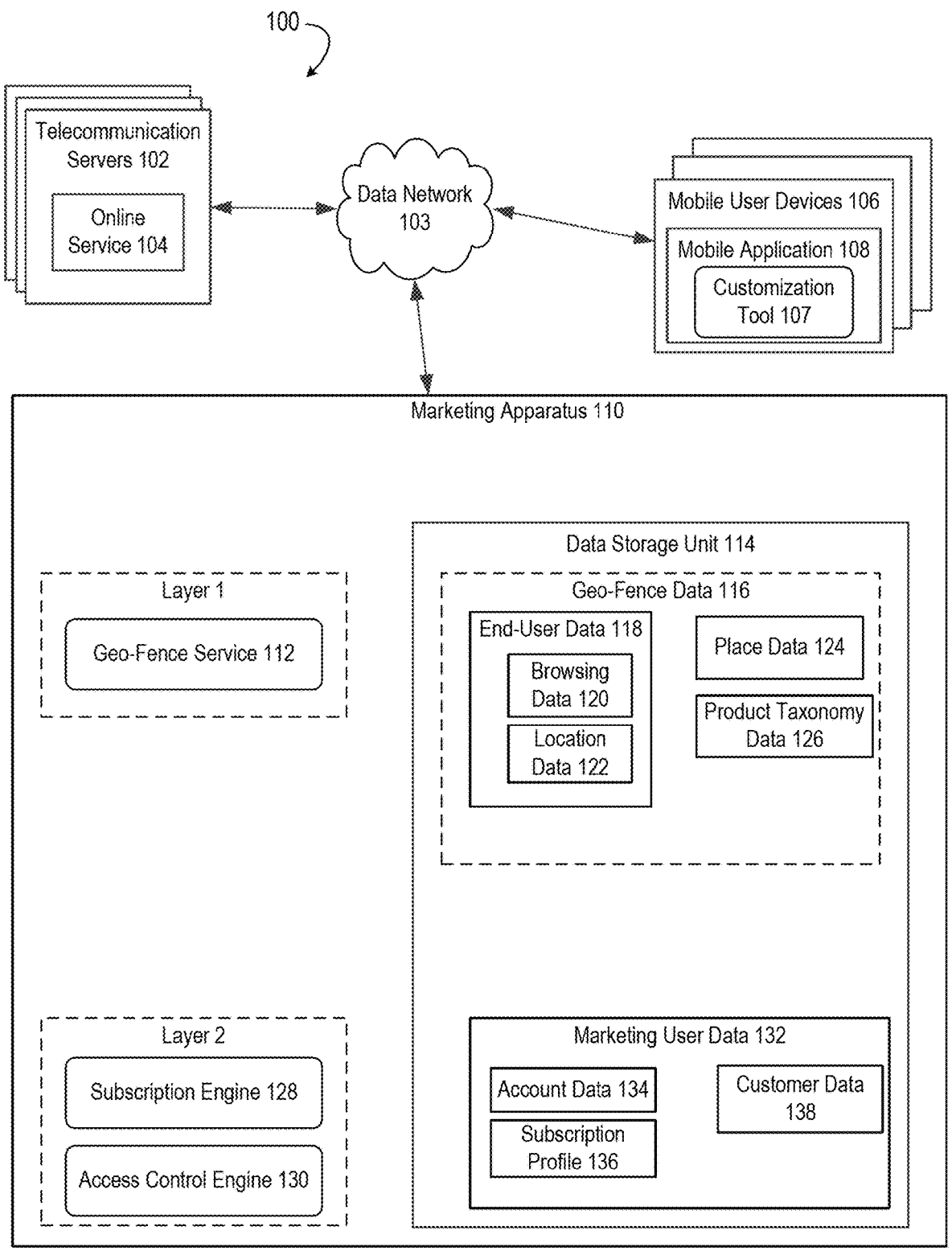
FIG. 1 depicts an example of a network environment for generating personalized geo-fences that customize electronic communications with mobile devices, according to some embodiments of the present disclosure.

Certain embodiments of the present disclosure involve a geo-fencing service for automatically constructing a personalized geo-fence such that targeted messages related to a particular product are transmitted to mobile devices associated with users having an affinity for the particular product. In some embodiments, the user's affinity is determined based on a combination of a user's behavior and a location of the user associated with the behavior. In one example, the user's behavior corresponds to the user executing a mobile application on a user device and using the mobile application to search for and review information about one or more desired products. Behavioral information regarding the desired products and associated location information corresponding to the location at which the user was positioned while accessing the mobile application are stored in a data storage unit of the geo-fencing service. The geo-fencing service customizes communications to certain mobile devices (and their associated users) based on a user affinity that the system determines from the location information and behavioral information. For instance, the geo-fencing service creates personalized geo-fences that limit the geo-fences to a subset of users (i.e., a "user segment") having similar affinities for the desired products.

The following example is provided to introduce certain embodiments described herein. In this example, a geo-fence service collects usage data from mobile devices associated with multiple users. The usage data indicates how often different users viewed, purchased, or otherwise interacted with electronic content describing a certain product or similar products via an online service, such as an e-commerce provider. The usage data also indicates locations at which the users performed the interactions via the mobile devices. The geo-fence service models, based on the usage data, a location-specific affinity of a particular user for a product. The location-specific affinity indicates an interest of the particular user in the product that increases when the particular user is positioned at the particular geographical location.

For example, for a set of users, the geo-fence service augments data describing how often each user browsed a particular product at a particular location by identifying similar users and semantically similar locations. The geo-fence service models, based on the usage data for the similar users, a particular user's browsing behavior for a certain product at a certain location based on the browsing behavior of similar users at the location. Furthermore, the geo-fence models the particular user's browsing behavior at additional locations based on the browsing behavior of the user (or other users) at semantically similar locations. Two geographic locations are semantically similar if they include similar numbers of certain types of points of interest (e.g., similar numbers of stores, hospitals, bakeries, etc.). The geo-fence service generates, for each user, a set of location-specific affinities based on the modeled browsing behavior of similar users across similar locations. In a given set of location-specific affinities includes, each location-specific affinity indicates the user's affinity for a given product or similar products at a respective location from a set of locations within a geographic area of interest. Thus, the set of location-specific affinities is a distribution of location-specific affinities for a user across the geographic area of interest.

Continuing with this example, the sets of location-specific affinities are used to generate personalized geo-fences. For instance, users having similar distributions of location-specific affinities are grouped together into user segments. For each user segment, a representative set of location-specific affinities is determined (e.g., by averaging the distributions of location-specific affinities for the users in the segment). Within the geographic area of interest, locations having a sufficiently high location-specific affinity in the representative set of location-specific affinities are selected. The geo-fence service designs, for a particular user segment, a set of geo-fences around groups of the selected locations (e.g., a first geo-fence for a first subset of the selected locations within a first portion of the area of interest, a second geo-fence for a second subset of the selected locations within a second portion of the area of interest, etc.).

The designed geo-fences are used to personalize communications for a particular user associated with a particular mobile device. For instance, the geo-fence service provides the designed geo-fences to an online service (e.g., an e-commerce provider). The online service uses the geo-fences to control communications with users belonging to different user segments. In one example, the online service determines that a particular mobile device is associated with a particular user. The online service identifies the user segment to which the particular user belongs. The online service selects one or more geo-fences corresponding to the identified user segment. The online service transmits messages to the user's mobile device in accordance with the selected geo-fences.

As used herein, the term "geo-fence" is used to refer to a virtual geographic boundary used by a mobile device, an online service in communication with the mobile device, or some combination thereof to trigger a communication with the mobile device. The communication is triggered in response to the mobile device entering or leaving a particular geographic area associated with the virtual geographic boundary.

As used herein, the term "product" is used to refer to electronic content that is accessible via an online service and that corresponds to a good, service, or other feature that may be purchased, manipulated, or otherwise used via the online service.

As used herein, the term "browse" is used to refer to accessing, via a data network, one or more products that are accessible from an online service or otherwise interacting with one or more products via an online service (e.g., purchasing a product, commenting on a product, etc.).

A geo-fencing service according to embodiments of the present disclosure may provide a benefit to the experience of subscribed users as well as to marketers or other developers executing such systems. For example, from the user's perspective, the user's experience is enhanced by the ability to receive targeted messages that are customized to both the user's interests as well as the user's locations. A convention geo-fencing service expends computing resources (e.g., processing power, network bandwidth, etc.) on bombarding a user with messages regarding products in which the user has little to no interest. The user's lack of interest in these messages may detract from the end-user experience and, in some cases, reduce the enrollment of users in online services involving geo-fences. In contrast, a geo-fencing service ensures that the approximation of the user's interests is accurate in light of the multiple factors used by the system to make the determinations, thereby limiting the transmission of targeted messages to users who are more likely to interact with these messages.

In some embodiments, focusing on these users (and thereby limiting the transmission of targeted messages via a particular geo-fence) increases efficiency with which the geo-fencing service allocates and uses available computing resources. For example, based on the volume of transmissions, a conventional system may require a separate (and relatively expensive) processor designated only to control the transmission of messages to users entering the geo-fences. The reduced volume reduces the amount of processing necessary for transmission and can allow other processors to share responsibilities of the system. Additionally or alternatively, focusing on relevant user segments allows for more efficient and effective allocation of financial resources for marketers attempting to communicate with users.

In additional or alternative embodiments, geo-fencing services are improved by addressing data scarcity problems.

For instance, a geo-fencing service, according to certain embodiments described herein, approximates as user affinity for multiple users and products, even if limited historical data is available for making these approximations. In one example, a particular user's browsing history may be limited, providing sparse data for estimating the user's affinity. The ability of the system to predict the user's affinity based on the affinities of users behaving similarly (e.g., visiting the same locations) allows each user to receive a personalized experience without unnecessarily wasting processing power on generic messages.

Examples of Operating Environment for Personalized Geo-Fence Design

Turning now to the drawings, FIG. 1 is a diagram depicting an example of a network environment 100 for generating personalized geo-fences that customize electronic communications with mobile user devices 106. In the example depicted in FIG. 1, the network environment 100 includes computing devices, such as one or more telecommunication servers 102 providing access to one or more online services 104 by mobile user devices 106, each of which executes one or more mobile applications 108. The telecommunication server 102 and mobile user device 106 are communicatively coupled to a marketing apparatus 110 via a data network 103 (e.g., the Internet, one or more local area networks, one or more wireless area networks, one or more wired area networks, one or more wide area networks, etc.). Examples of the mobile user devices 106 include, but are not limited to, a personal computer, tablet computer, a smart phone, or any other mobile device having one or more processors.

In some embodiments, a geo-fence service 112, which is executed by one or more processing devices of the marketing apparatus 110, designs personalized geo-fences for use by one or more online services 104 (e.g., e-commerce providers). For example, an online service 104 configures the telecommunication server 102 to communicate with one or more mobile user devices 106 in accordance with geo-fences designed by the marketing apparatus 110. For example, the marketing apparatus 110 designs geo-fences and provides data describing these geo-fences to the telecommunication server 102. The communication of this data causes a telecommunication server 102 to transmit messages to a mobile user device 106 if the mobile user device 106 is positioned within a particular geo-fence designed by the marketing apparatus 110.

Figure 2:
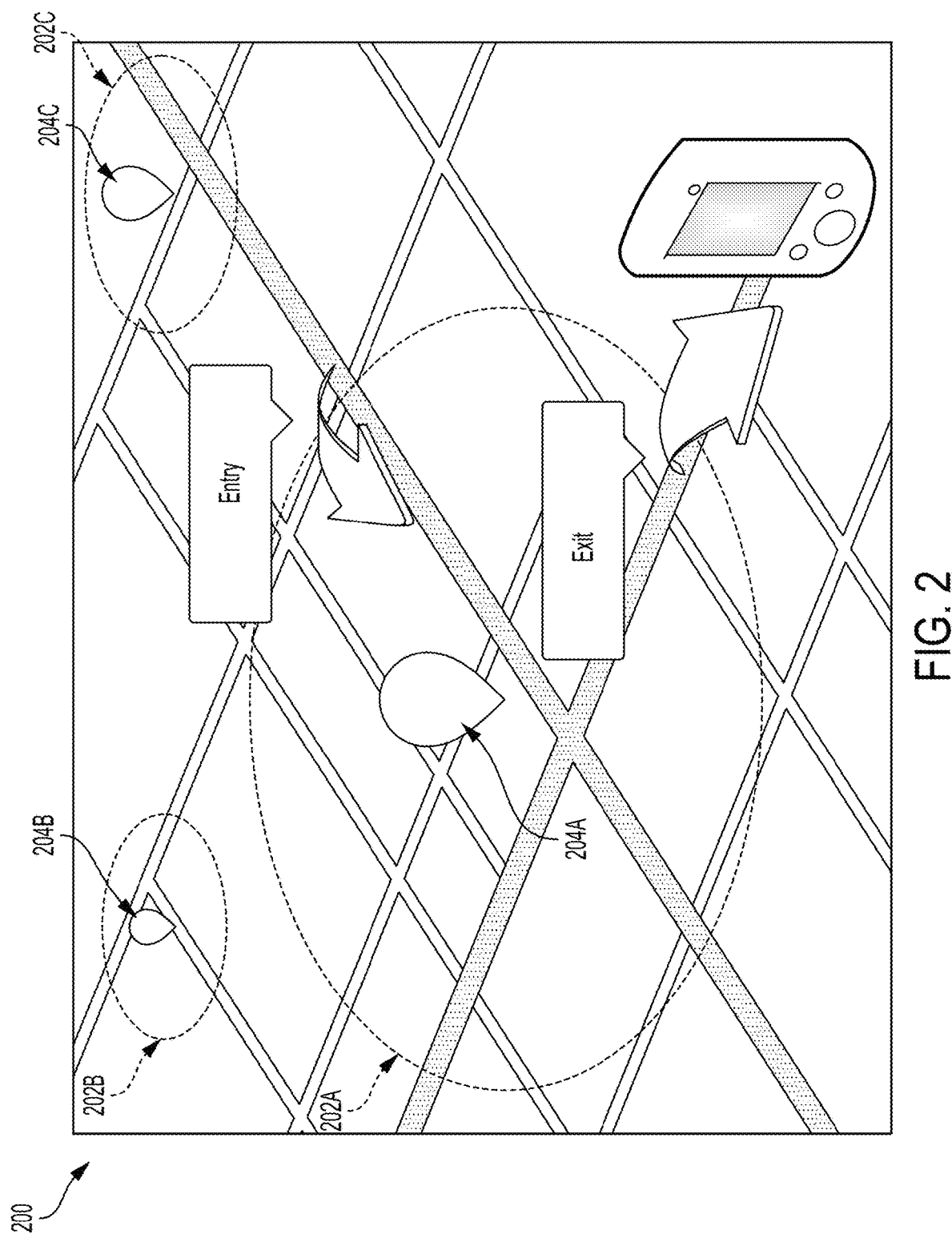
FIG. 2 depicts examples of geo-fences, according to some embodiments of the present disclosure.

FIG. 2 is a map diagram depicting examples of geo-fences 200. In this example, a geo-fence boundary 202a defines a geo-fence around a location 204a, a geo-fence boundary 202b defines a geo-fence around a location 204b, and a geo-fence boundary 202c defines a geo-fence around a location 204c. Each of the locations 204a-c may be associated with one or more online services 104. For example, the locations 204a-c may be stores associated with online e-commerce providers.

One or more events associated with a mobile user device 106 located in or near a geo-fence can trigger a transmission of messages to the mobile user device 106. Examples of these events include (but are not limited to) entry into the geo-fence, exit from the geo-fence, dwelling within the geo-fence for a threshold amount of time, etc. The online service 104 transmits one or more messages to a mobile application 108 on the mobile user device 106. For instance, in the example depicted in FIG. 2, a mobile user device 106 associated with a certain user will receive messages from an online service 104 associated with the location 204a after the mobile user device 106 enters the geo-fence defined by the geo-fence boundary 202a, after the mobile user device 106 remains within the geo-fence boundary 202a for a specified amount of time, or upon exit of the mobile user device 106 from the geo-fence boundary 202a. The mobile user device 106 will stop receiving messages from the online service 104 associated with the location 204a after the mobile user device 106 exits the geo-fence defined by the geo-fence boundary 202a.

As described in detail herein, a user is unlikely to have the same preference for all products even at the same location. For example, women might be less interested in products for men. Even across all products for women, different users can have different preferences. Therefore, the geo-fence service 112 can generate different geo-fences for each product using the geo-fence data 116.

Returning to FIG. 1, each telecommunication server 102 includes at least one application supported by the marketing apparatus 110. It is to be appreciated that the following description is now explained using the telecommunication server 102 as an example and any other user device can be used.

The marketing apparatus 110 includes one or more engines for enabling one or more online services 104 to transmit communications to mobile user devices 106 in a personalized manner. In some embodiments, these engines include one or more of the engines depicted in FIG. 1. In other embodiments, one or more of the engines depicted in FIG. 1 may be omitted from a marketing apparatus 110. The marketing apparatus 110 can be implemented using one or more servers, one or more processing devices, one or more platforms with corresponding application programming interfaces, cloud infrastructure, or the like. In addition, each engine can also be implemented using one or more servers, one or more processing devices, one or more platforms with corresponding application programming interfaces, cloud infrastructure, or the like.

The marketing apparatus 110 also includes a data storage unit 114. The data storage unit 114 can be implemented as one or more databases or one or more data servers.

The data storage unit 114 stores geo-fence data 116 that is used by the geo-fence service 112. The geo-fence service 112 uses the geo-fence data 116 to generate geo-fence designs, as described in greater detail herein with respect to FIGS. 2-7. Examples of geo-fence data 116 includes end-user data 118 (e.g., browsing data 120 and location data 122), place data 124, and product taxonomy data 126.

In some embodiments, the end-user data 118 includes usage logs from one or more suitable mobile applications 108, which are used for accessing an online service 104 (e.g., a dedicated mobile application for accessing an electronic commerce provider). A customization tool 107 that is included in (or otherwise used by) the mobile application 108 generates the end-user data 118. In some embodiments, the customization tool 107 configures the mobile user device 106 to transmit the end-user data 118 to the marketing apparatus 110. In additional or alternative embodiments, the customization tool 107 configures the mobile user device 106 to transmit the end-user data 118 to a telecommunication server 102, which in turn transmits the end-user data 118 to the marketing apparatus 110.

The end-user data 118 is generated by interactions with one or more online services 104 via the mobile user device 106. In one example, an online service 104 provides electronic content, which is viewable in a mobile application 108, for purchasing or otherwise accessing one or more products (e.g., goods, services, digital content, etc.). The mobile application 108 allows an end user of the mobile user device 106 to interact with the electronic content. One example of data describing these interactions is browsing data 120. The browsing data 120 includes a user browsing history or other usage logs generated from interactions by the mobile user device 106 with the online service 104. The browsing history can indicate, for example, product views, product purchases, and the like. Another example of data describing these interactions is location data 122. The location data 122 can describe locations tracked by a global positioning system ("GPS") of the mobile user device 106. The locations are associated with the interactions. An example of location data is a set of GPS coordinates (e.g., a <latitude, longitude> tuple).

In some embodiments, the geo-fence data 116 includes end-user data 118 for a set $\mathcal{U}$ of users and a set $\mathcal{P}$ of products. For each pair (u,p)∈U×P, the end-user data 118 include values $\mathcal{B}$(u, p, l)=browse_cnt, where the browse_cnt term represents the number of times a user u browsed the product p at a geographic location l∈L. The browse_cnt term is zero if a user has not browsed the product at that location. For a single user u∈U, the difference in counts with locations can be attributed to variations in the user's preference for the product at different locations. This location-dependent preference is the location-specific affinity for a given user.

The geo-fence data 116 also includes place data 124. The place data 124 describes one or more geographical areas of interest. For example, the place data 124 may include a set $\mathcal{G}$ of grid squares that define one or more geographical areas of interest. For any particular grid square g, a set $\mathcal{M}$(g), where g∈G, is a set of all locations l∈L that are positioned within the particular grid square g. A set $\mathcal{L}'\subseteq L$ is a set of all locations not belonging to any grid square in $\mathcal{G}$. The place data 124 may also include information about semantic points of interest (e.g., restaurants, schools, different types of stores, etc.) included in or around each location.

The geo-fence data 116 also includes product taxonomy data 126. The product taxonomy data 126 describes various products with which a user interacted via an online service 104. An example of this product taxonomy data 126 is a multi-level classification of products, which allows the geo-fence service 112 to identify similarities between different products. In some embodiments, the product taxonomy data 126 relevant to a particular online service 104 is provided by the online service 104 to the geo-fence service 112. The product taxonomy data 126 is provided via communications between a telecommunication server 102 (or another computing device associated with hosting the online service 104) and the marketing apparatus.

In some embodiments, the marketing apparatus 110 can be divided into two layers of engines. For example, Layer 1 includes core engines (e.g., one or more engines of the geo-fence service 112) that provide workflows to a user associated with a telecommunication server 102. Layer 2 includes shared engines that are shared among the core engines. Any core engine can call any of the shared engines for execution of a corresponding task. In additional or alternative embodiments, the marketing apparatus 110 does not have layers, and each core engine can have an instance of the shared engines. In various embodiments, each core engine can access the data storage unit 114 directly or through the shared engines.

In some embodiments, a user of a telecommunication server 102 (or other computing device associated with hosting the online service 104) visits a webpage or an application store to explore applications supported by the marketing apparatus 110. The marketing apparatus 110 provides the applications as a software as a service ("SaaS") (e.g., the geo-fence service 112), as a software module (e.g., a customization tool 107) that can be installed on the mobile user device 106 as part of a mobile application 108 provided by the online service 104, or some combination thereof. A user creates an account with the marketing apparatus 110 by providing user details and also by creating login details. In additional or alternative embodiments, the marketing apparatus 110 can automatically create login details for the user in response to receipt of the user details. The user can also contact the entity offering the services of the marketing apparatus 110 and can get the account created through the entity. The user details are received by a subscription engine 128 and stored as marketing user data 132 in the data storage unit 114. In some embodiments, the marketing user data 132 further includes account data 134, under which the user details are stored.

A user can opt for a subscription to one or more engines of the marketing apparatus 110. Based on subscription details of the user, a user subscription profile 136 is generated by the subscription engine 128 and stored. The user subscription profile 136 is stored in the data storage unit 114 and indicates entitlement of the user to various products or services. The user subscription profile 136 also indicates the type of subscription, e.g., premium subscription or regular subscription.

Each engine of the marketing apparatus 110 also stores customer data 138 for the user in the data storage unit 114. A marketing user or other user of the marketing apparatus can have one or more customers, including potential customers, and hence, the one or more engines of the marketing apparatus 110 store the customer data 138. The customer data 138 can be shared across these engines or can be specific to each engine. In some embodiments, access data is a part of the customer data 138. The access to the customer data 138 is controlled by an access control engine 130, which can be shared across the engines of the marketing apparatus 110 or each engine can have one instance of the access control engine 130. The access control engine 130 determines if the user has access to a particular customer data 138 based on the subscription of the user and access rights of the user.

Examples of users of the system depicted in FIG. 1 include, but are not limited to, marketing professionals who use digital tools to generate, edit, track, or manage online content, or to manage online marking processes, end users, administrators, users who use image tools to create, edit, track, or manage images, advertisers, publishers, developers, content owners, content managers, content creators, content viewers, content consumers, designers, editors, any combination of these users, or any other user who uses digital tools to create, edit, track, or manage digital experiences.

Digital tools, as described herein, include a tool that is used for performing a function or a workflow electronically. Digital tools include the marketing apparatus 110. Digital experience, as described herein, includes interactions with content that can be consumed through an electronic device. Content, as described herein, includes electronic content. Examples of the content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

Examples of Methods for Personalized Geo-Fence Design

Figure 3:
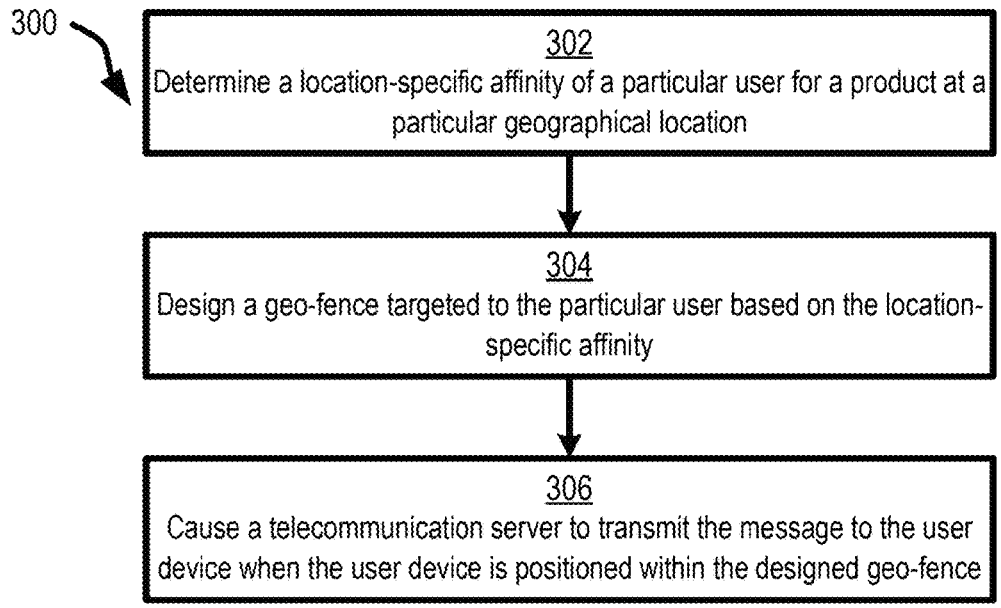
FIG. 3 depicts an example of a process for generating personalized geo-fences that customize electronic communications with mobile devices, according to some embodiments of the present disclosure.

The geo-fence service 112 depicted in FIG. 1 can generate geo-fence designs using one or more operations described herein. For instance, FIG. 3 depicts an example of a process 300, which may be performed by the marketing apparatus 110 or another suitable computing system, for generating personalized geo-fences that customize electronic communications with mobile devices. In some embodiments, one or more processing devices implement operations depicted in FIG. 3 by executing suitable program code (e.g., the geo-fence service 112). For illustrative purposes, the process 300 is described with reference to certain examples depicted in the figures. Other implementations, however, are possible.

At block 302, the process 300 involves determining a location-specific affinity of a particular user for a product at a particular geographical location. The location-specific affinity indicates an interest of the particular user in the product, where the interest increases when the particular user is positioned at the particular geographical location. The geo-fence service 112 determines a location-specific affinity based on stored user information that is associated with a particular user and retrieved from a mobile user device 106 (e.g., using the customization tool 107). The stored user information includes, for example, browsing data 120 and location data 122.

For example, the geo-fence service 112 executes one or more algorithms that automatically identify different geo-targeting areas, which are suitable for creating geo-fences for different users. The geo-fence service 112 analyzes multiple users' interactions via one or more mobile applications 108, where the user interactions relate to various products at various types of locations (e.g., browsing to a product or similar products within the mobile application 108, conducting online purchases of the product or similar products within the mobile application 108, etc.). Based on this analysis, the geo-fence service 112 models various user interactions and location preferences across a set of users and a set of products (e.g., users described in the end-user data 118 and locations described in the place data 124). The geo-fence service 112 uses this model to determine a location-specific affinity for a product.

For example, in some embodiments, the geo-fence service 112 computes an intrinsic affinity for each user in a set of users. The intrinsic affinity indicates the interest of the user towards the product at given location, where the interest is determined based on prior interactions with the mobile application that involve the product or a similar product. Examples of these prior interactions include browsing to the product or a similar product, performing an online purchase of the product or a similar product, etc. The set of "similar" products includes, in various embodiments, other products that a user has viewed or purchased via the mobile application, products having similar content (e.g., taxonomy classification, multi-level classification, etc.), or some combination thereof. The geo-fence service 112 can determine an intrinsic affinity that indicates how a user's browsing behavior with respect to one or more products translates to the user's potential interest in one or more similar products. (Examples of determining intrinsic affinity are described herein with respect to FIG. 4.)

In some embodiments, the geo-fence service 112 augments these intrinsic affinities with user-similarity-based affinities. For example, the end-user data 118 may lack a browsing history with respect to certain products for a particular user. But the behavioral similarity of different users allows the geo-fence service 112 to compute a user-similarity-based affinity for a particular user at a particular location, even if insufficient data exists for the user with respect to the location (e.g., because the user has never been to the location before), based on the behavior of similar users for which the geo-fence service 112 has sufficient data.

Thus, a user-similarity-based affinity indicates a given user's affinity for a product based on the affinities of users similar to the given user. For example, if a user goes shopping with friends, the user's purchases may be influenced by the opinions and preferences of others in the group. This type of behavior is represented by the user-similarity-based affinity, where "friends" are represented in a model by users that are more similar to a given user. (Examples of determining user-similarity-based affinity are described herein with respect to FIG. 4.)

In additional or alternative embodiments, the geo-fence service 112 further augments affinity data (e.g., intrinsic affinities, user-similarity-based affinities, etc.) using semantic similarity among different locations. For instance, the geo-fence service 112 identifies a semantic description for one or more geographic locations (e.g., "residential area," "workplace," "park," etc.). The location-based affinity indicates that, for example, users prefer comparing certain kinds of products when the users are located in a competitor's store and buying certain products when the users are at their home. The geo-fence service 112 estimates the affinity of users towards a certain product with respect to a location, and can verify or otherwise refine this affinity estimate based on estimated affinities for other locations having similar semantics. The geo-fence service 112, by determining product preferences that vary with location semantics, identifies location-sensitive behavior, which enables customization of geo-fencing content based on users' interests or intent at various locations. (Examples of using semantic similarity to determine a location-specific affinity for a particular user are described herein with respect to FIG. 4.)

A processing device executes the geo-fence service 112 (or suitable other program code) to implement block 302. For example, the program code for the geo-fence service 112, which is stored in a non-transitory computer-readable medium, is executed by one or more processing devices. Executing the geo-fence service 112 causes the processing device to access stored user information obtained from a user device and associated with a particular user, such as a portion of the end-user data 118. The stored user information is stored in the same non-transitory computer-readable medium that stores the program code for the geo-fence service 112 or a different non-transitory computer-readable medium (e.g., the data storage unit 114 depicted in FIG. 1). In some embodiments, accessing the stored user information involves communicating, via a data bus, suitable signals between a local non-transitory computer-readable medium and the processing device. In additional or alternative embodiments, accessing the stored user information involves communicating, via a data network, suitable signals between a computing system that includes the non-transitory computer-readable medium and a computing system that includes the processing device.

At block 304, the process 300 involves designing a geo-fence targeted to the particular user based on the location-specific affinity. For example, the geo-fence service 112 uses the location-specific affinity of the particular user to determine that a geo-fence for that user should be larger as compared to another user who is not interested in the product to which the location-specific affinity applies. A processing device executes the geo-fence service 112 or other program code to implement block 304. In one example, the program code for the geo-fence service 112, which is stored in a non-transitory computer-readable medium, is executed by one or more processing devices. Executing the geo-fence service 112 causes the processing device to perform one or more of the following operations.

In some embodiments, the geo-fence service 112 uses a set of modeled location-specific affinities for various geographical locations to design a particular geo-fence. A set of modeled location-specific affinities is an average distribution, for multiple users in a particular segment, of location-specific affinities across different locations in a geographic area of interest. The geo-fence service 112 selects a subset of these geographical locations to generate one or more geo-fences. The subset is selected based on each selected geographical location having a modeled location-specific affinity that is greater than a threshold affinity. The geo-fence service 112 groups the selected locations into geographic clusters within the geographic area of interest, where each geographic cluster includes one or more of the selected locations within a certain portion of the geographic area of interest (e.g., the selected locations within a particular square mile). The geo-fence service 112 derives one or more geo-fences from boundaries around the various geographic clusters. In this manner, the geo-fence service 112 designs a geo-fence for a particular geographic location by identifying a boundary around a geographic cluster, where the geographic cluster includes the particular geographic area and corresponds to a user segment that includes the particular user. (Detailed examples of generating modeled location-specific affinities and designing associated geo-fences are described herein with respect to FIG. 4.)

At block 306, the process 300 involves causing a telecommunication server to transmit the message to the user device when the user device is positioned within the designed geo-fence. A processing device executes the geo-fence service 112 or other program code to implement block 306. In one example, the program code for the geo-fence service 112, which is stored in a non-transitory computer-readable medium, is executed by one or more processing devices. Executing the geo-fence service 112 causes the processing device to perform one or more of the following operations.

For example, the geo-fence service 112 configures the marketing apparatus 110 to perform one or more operations that result in a telecommunication server 102, which is associated with one or more online services 104, transmitting messages to a mobile user device 106 if the mobile user device 106 is within a geo-fence generated using the marketing apparatus 110. For example, an online service 104, which is aware of one or more geo-fences generated using the marketing apparatus 110, communicates with mobile applications 108 and thereby monitors locations of mobile user devices 106. If an online service 104 determines that a mobile user device 106 is within a geo-fence that is generated using the marketing apparatus 110, the online service determines whether the geo-fence is associated with a particular user associated of the mobile user device 106 (e.g., because the user belongs to a particular user segment for which the geo-fence was created). If so, the online service 104 transmits a message to the mobile user device.

The marketing apparatus 110 can perform any suitable operation for causing the telecommunication server 102 to transmit messages of an online service 104 to a mobile user device 106. In some embodiments (e.g., embodiments in which an online service 104 is independent of the marketing apparatus 110), causing a telecommunication server 102 to transmit messages in accordance with designed geo-fences involves communicating, via one or more data networks 103, data describing the designed geo-fences. In additional or alternative embodiments (e.g., embodiments in which an online service 104 controlled by the marketing apparatus 110), causing a telecommunication server 102 to transmit messages in accordance with designed geo-fences involves communicating, via one or more data networks 103, instructions to the telecommunication server 102 to monitor the locations of the mobile user devices 106 associated with the designed geo-fences and to transmit messages in accordance with the designed geo-fences.

Figure 4:
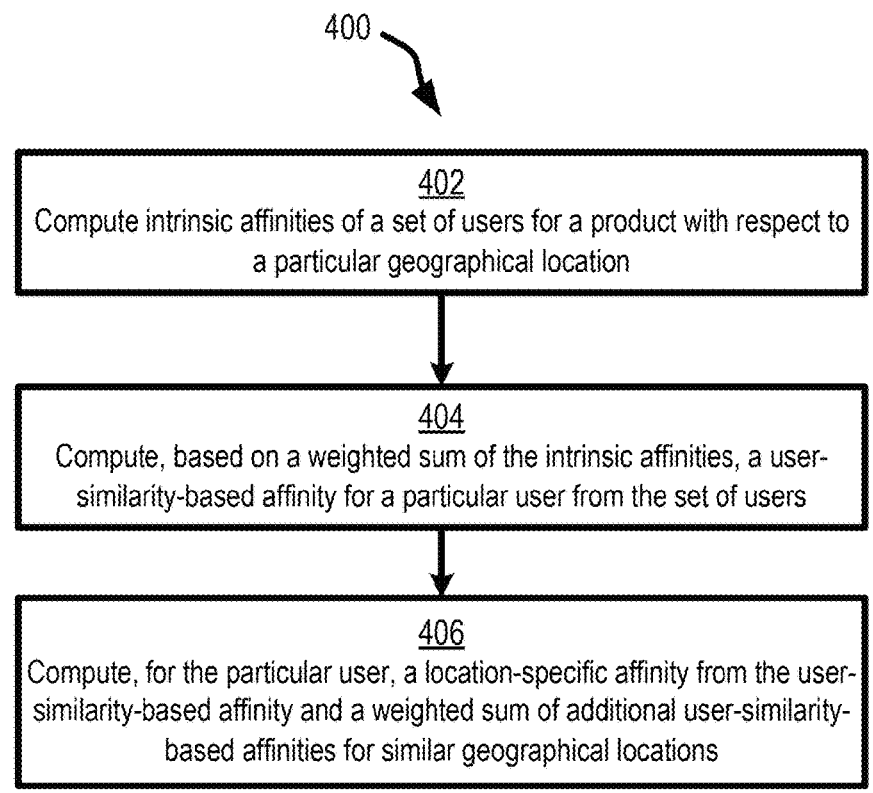
FIG. 4 depicts an example of a process for computing a location-specific affinity for a particular user based on user similarities and semantic location similarities, according to some embodiments of the present disclosure.

As noted with respect to the process 300, similarities among different users, products, and locations can be used to model a particular user's location-specific affinity for a product. For example, FIG. 4 is a flow diagram depicting an example of computing a location-specific affinity for a particular user based on user similarities and semantic location similarities. In some embodiments, one or more processing devices implement operations depicted in FIG. 3 by executing suitable program code (e.g., the geo-fence service 112). For illustrative purposes, the process 300 is described with reference to certain examples depicted in the figures. Other implementations, however, are possible.

At block 402, the process 400 involves computing intrinsic affinities of a set of users for a product with respect to a particular geographical location. A processing device executes the geo-fence service 112 or other program code to implement block 402. In one example, the program code for the geo-fence service 112, which is stored in a non-transitory computer-readable medium, is executed by one or more processing devices. Executing the geo-fence service 112 causes the processing device to perform one or more of the following operations.

The geo-fence service 112 can determine an intrinsic affinity that indicates how a user's browsing behavior with respect to one or more products translates to the user's potential interest in one or more similar products. In some embodiments, the geo-fence service 112 uses the product taxonomy data 126 to determine product similarity. An example of the product taxonomy data 126 is a dataset having product information that is expressed as a 3-tuple <category, subcategory, vertical>.

Figure 5:
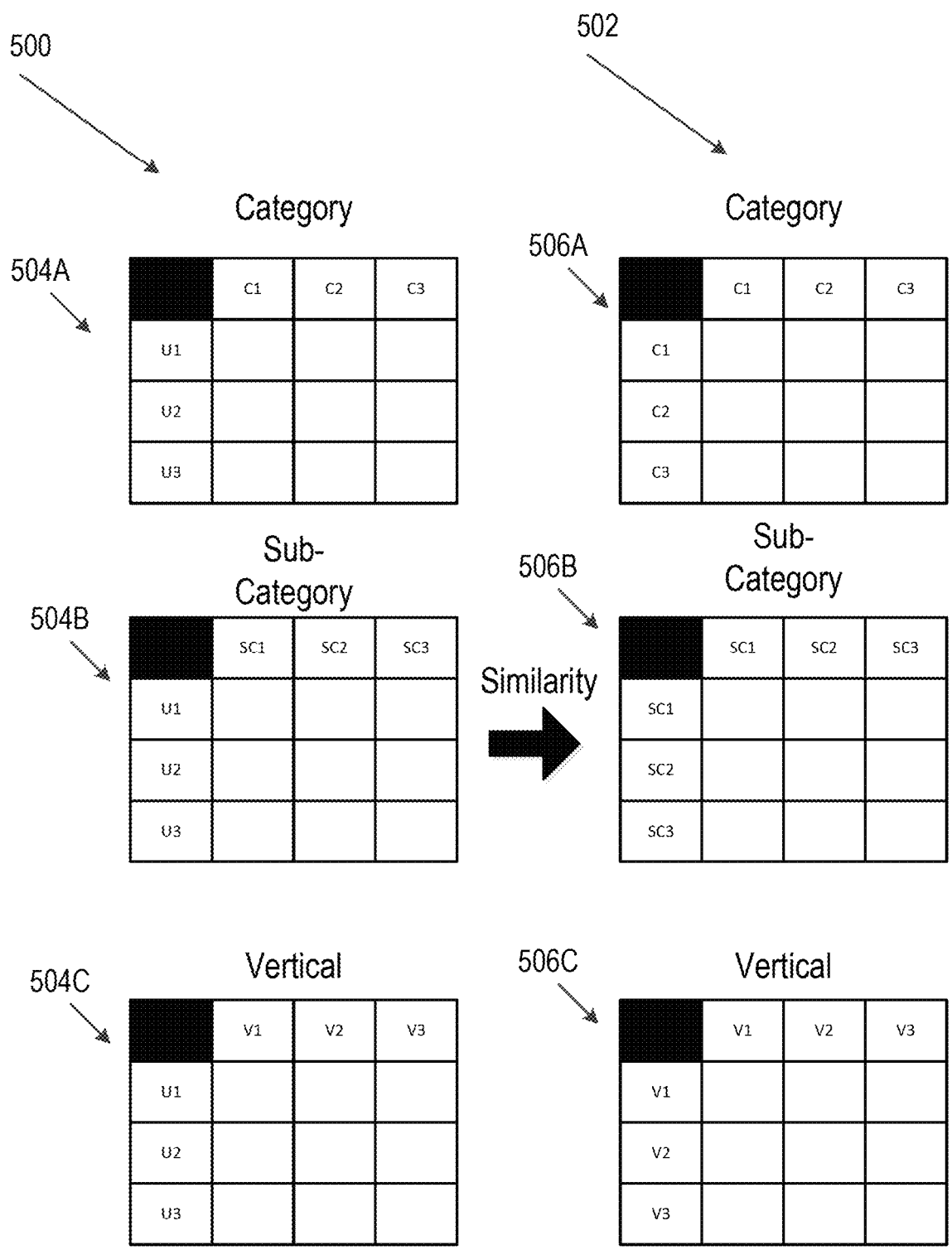
FIG. 5 depicts examples of using taxonomy information for comparing products to determine user affinity, according to some embodiments of the present disclosure.

FIG. 5 depicts examples of taxonomy information for comparing products to determine user affinity according to some embodiments. (Although FIG. 5 depicts an example using 3-tuples, any number of levels may be used in a product hierarchy.) In this example, browsing data 500 includes tables 504a-c. In this example, the geo-fence service 112 uses a set of categories C (which are captured in the table 504a), a set of subcategories S (which are captured in the table 504b), and a set of verticals V (which are captured in the table 504c). The geo-fence service 112 determines $\mathcal{B}_{cat} \in [0,1]^{|C| \times |U|}$, which identifies a relative number of browsing interactions performed by various users (i.e., a normalized count of browsing interactions), for products belonging to each category, irrespective of location. The term $B_{cat}[c_i]$ represents a vector of size |U|, which represents the relative numbers of browsing interactions for products belonging to the category $c_i$ by users. The geo-fence service 112 also determines $\mathcal{B}_{sub-cat} \in [0,1]^{|S| \times |U|}$ and $\mathcal{B}_{vert} \in [0,1]^{|V| \times |U|}$ constructed for subcategories and verticals, respectively.

The geo-fence service 112 computes similarity between two products, $p_i, p_j \in P$, where a given product $p_i$ is expressed as $<c_i, s_i, v_i>$, using any suitable formula. An example of a suitable formula is:

$$sim_{product}(p_i, p_j) = w_c * cosine\_sim(\mathcal{B}_{cat}[c_i], \mathcal{B}_{cat}[c_j]) +$$
$$w_s * cosine\_sim(\mathcal{B}_{sub-cat}[s_i], \mathcal{B}_{sub-cat}[s_j]) +$$
$$w_v * cosine\_sim(\mathcal{B}_{vert}[v_i], \mathcal{B}_{vert}[v_j]). \quad (1)$$

In Equation (1), the term cosine_sim(a, b) refers to the cosine similarity between vectors a and b (e.g., two columns from one of the tables 504a-c in the example of FIG. 5). The terms $w_c$, $w_s$, and $w_v$ are weights such that $w_c+w_s+w_v=1$. The weight given to a lower classification level is higher (e.g., the "vertical" level in this example). This weighting scheme indicates that classifications become more generic at higher levels (e.g., the "category" in this example).

In the example depicted in FIG. 5, the geo-fence service 112 generates the tables 506a-c. The table 506a indicates the cosine similarities for the categories, with entry ($c_i$, $c_j$) indicating the cosine similarities for the ith and jth categories. The table 506b indicates the cosine similarities for the sub-categories, with entry ($sc_i$, $sc_j$) indicating the cosine similarities for the ith and jth sub-categories. The table 506c indicates the cosine similarities for the verticals, with entry ($v_i$, $v_j$) indicating the cosine similarities for the ith and jth verticals.

Returning to FIG. 4, the geo-fence service 112 computes the intrinsic affinity in block 402 using any suitable function. An example of a suitable function for computing the intrinsic affinity $\mathcal{A}_{int}(u, l, p) \in [0,1]$ of a user $u \in U$ for a product $p \in P$ at location $l \in L$ is:

$$\mathcal{A}_{int}(u, p, l) \triangleq \frac{\Sigma_{p' \in P} sim_{product}(p, p') \times \mathcal{B}(u, p', l)}{(\Sigma_{p' \in P} sim_{product}(p, p') \times (\Sigma_{p' \in P} \mathcal{B}(u, p', l))}. \quad (2)$$

Equation (2) provides a weighted average of browsing fractions of multiple products p' with weights dictated by the products' similarities to the product p of interest. The term p' represents a product in the set $\mathcal{P}$ other than the product p of interest. The term $sim_{product}(p,p')$ represents a similarity between products p and p'. The term $\mathcal{B}(u, p', l)$ indicates a number of time that a user u has interacted with (or otherwise accessed) a product p' via the mobile application at a location l.

At block 404, the process 400 involves computing, based on a weighted sum of the intrinsic affinities, a user-similarity-based affinity for a particular user from the set of users. A processing device executes the geo-fence service 112 or other program code to implement block 404. In one example, the program code for the geo-fence service 112, which is stored in a non-transitory computer-readable medium, is executed by one or more processing devices. Executing the geo-fence service 112 causes the processing device to perform one or more of the following operations.

The user-similarity-based affinity indicates, for example, that certain users browse similar products at similar semantic locations. The semantic location models a user's interests and the semantic meanings of a place where a user stayed.

For instance, the geo-fence service 112 computes, generates, or otherwise obtains location-based data describing various users' behavior and interests in proximity to a given location. Examples of this location-based data include stay points, stay point semantics, stay point clusters, and user similarity. The geo-fence service 112 identifies a geographic region as a stay point if a user has been located in that geographic region for longer than a specified time threshold.

Any suitable algorithm may be used by the geo-fence service 112 for computing or otherwise obtaining stay points. An example of a suitable algorithm for computing a stay point is described in Q. Li et al., "Mining user similarity based on location history," *In Proceedings of the 16th ACM SIGSPATIAL international conference on Advances in geographic information systems*, page 34, ACM, 2008, which is incorporated by reference herein. The geo-fence service 112 identifies a set $\mathcal{L}$ of stay points usable for generating geo-fence designs. The set $\mathcal{L}$ of stay points may be, for example, a set of all stay points that the geo-fence service 112 detects in the dataset.

Figure 6:
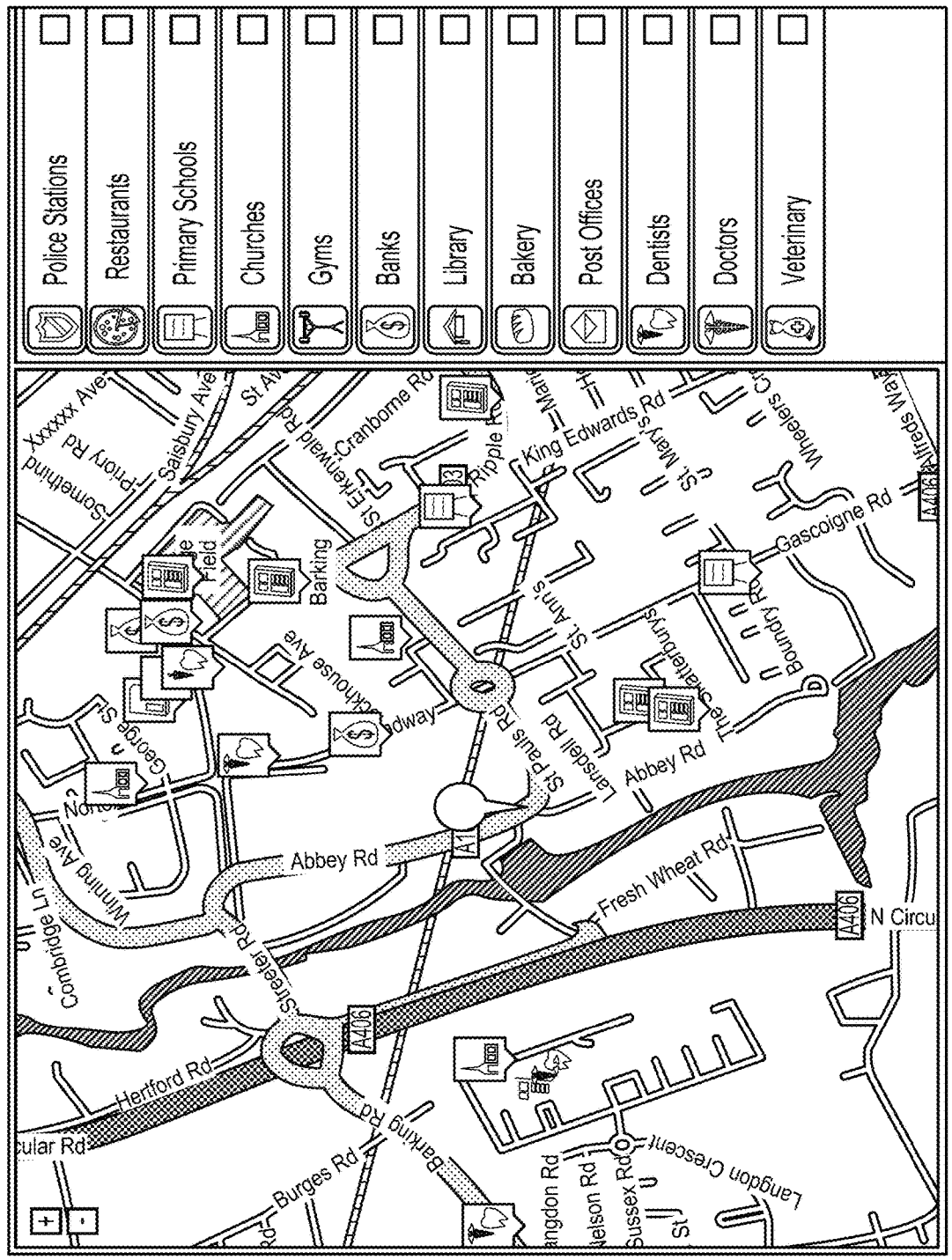
FIG. 6 depicts examples of semantic information for locations in a geographical region to determine user affinity, according to some embodiments of the present disclosure.

The geo-fence service 112 labels or otherwise identifies the stay points with stay point semantics, which identify types for the stay points. In some embodiments, a stay point semantic for a given stay point is determined by converting the stay point's GPS latitude, GPS longitude, and a surrounding area to a semantic vector. The semantic vector is a feature vector indicating how many of each semantic points of interest (e.g., residential areas, food stores, etc.) are located within the stay point corresponding to the semantic vector. Examples of semantic points of interest are depicted in FIG. 6, which identifies points of interest such as police stations, churches, gyms, etc.

Thus, in some embodiments, a semantic vector characterizes a geographic location based on the distribution of different types of businesses, residences, or semantic points of interest in the area. In a simplified example, a stay point having a certain <latitude, longitude> tuple is represented by a semantic vector of [0.7, 0.2, 0.1], which indicates that seven restaurants (i.e., the "0.7" value), two hotels (i.e., the "0.2" value), and one sports store (i.e., the "0.1" value) are located in or around this stay point. Semantic vectors can have any number of dimensions (e.g., more than 100 dimensions representing different types of places).

In some embodiments, the geo-fence service 112 computes a semantic similarity $sim_{loc}(l,l')$ between a first location l and a second location l' based on the following formula:

$$sim_{loc}(l,l')=\text{cosine\_sim}_v(\mathcal{P}\mathfrak{T}_l, \mathcal{P}\mathfrak{T}_{l'}). \quad (3)$$

In Equation (3), the term $\mathcal{P}\mathfrak{T}_l$ is a semantic vector for the first location l, and the term $\mathcal{P}\mathfrak{T}_{l'}$ is a semantic vector for second location l'.

The geo-fence service 112 uses the semantic vectors for various stay points to generate stay point clusters. A set of stay points in a given stay point cluster share similar semantic features (e.g., similar numbers of semantic points of interest). The geo-fence service 112 uses the stay point clusters to identify locations in which users will exhibit similar behavior.

The geo-fence service 112 hierarchically clusters stay points that have been visited by the user (i.e., location points described by the location data 122). Using the semantic vectors for hierarchical clustering allows the geo-fence service 112 to use semantic similarity between locations, rather than merely geographic coordinates.

Figure 7:
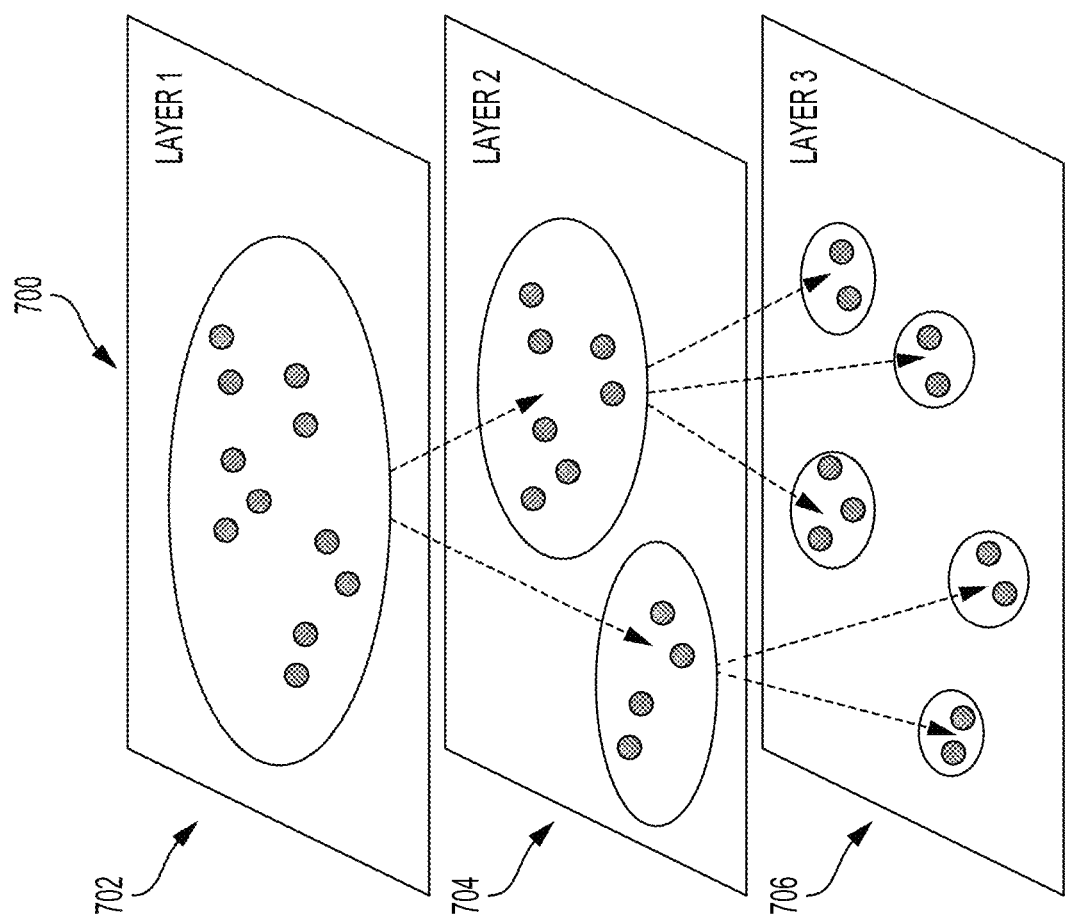
FIG. 7 depicts an example of a hierarchy of users' geographical locations to determine user affinity, according to some embodiments of the present disclosure.

An example of such a multi-level hierarchy of different clusters is depicted in FIG. 7. In FIG. 7, various semantic vectors define the same set of points in each layer of the hierarchy 700. The first layer 702 includes one set of clusters of these points (e.g., the single cluster in the layer 702). The second layer 704 includes a second set of clusters of these points (e.g., the two clusters in the layer 704). The third layer 706 includes a third set of clusters of these points (e.g., the two clusters in the layer 706). In some embodiments, the geo-fence service 112 determines a cut point for the hierarchy using a gap statistic value, where the gap statistic controls a number of layers in the hierarchy. Examples of using gap statistic values for hierarchical clustering are described in R. Tibshirani et al., "Estimating the number of clusters in a data set via the gap statistic," *Journal of the Royal Statistical Society: Series B (Statistical Methodology)*, 63(2):411-423, 2001, incorporated by reference herein. The geo-fence service 112 considers all the layers of the hierarchy from the optimal cut point to the root of the hierarchy.

The geo-fence service 112 uses the semantic location hierarchy to compute the similarity of any two users at a given layer by calculating the similarity between the products users have browsed at the common clusters of that level. The geo-fence service 112 computes an overall user-similarity-based affinity by summarizing the weighted similarity at each layer of the hierarchy.

In some embodiments, the geo-fence service 112 computes the user-similarity-based affinity as a weighted sum of similarity at each layer of the hierarchy of clustered stay points. For example, to determine a similarity $user\_sim_h(u_i, u_j)$ between a first user $u_i$ and a second user $u_j$ at a layer h of the hierarchy, the geo-fence service 112 identifies common clusters at the layer h having locations visited by both the first user $u_i$ and the second user $u_j$. In some embodiments, the geo-fence service 112 computes a similarity at the layer h using, for example, the following two formulas:

$$user\_sim_h(u_i, u_j) = \frac{\Sigma_{cl \in clusters(h)} user\_sim_{clust}(u_i, u_j, cl)}{|clusters(h)|}, \text{ and} \quad (4)$$

$$user\_sim_{clust}(u_i, u_j, cl) = \frac{\Sigma_{p_i \in pl_i} \Sigma_{p_j \in pl_j} sim_{product}(p_i, p_j)}{|pl_i| * |pl_j|}. \quad (5)$$

In Equations (4) and (5), the term $user\_sim_{clust}(u_i, u_j, cl)$ refers to the similarity between two users having their location points in a cluster cl. The term $user\_sim_h(u_i, u_j)$ refers to the similarity at hierarchy layer h. The terms $pl_i$ and $pl_j$ represent a set of products viewed by the first user $u_i$ and the second user $u_j$, respectively, at location points that are in the cluster cl. The term clusters(h) represents a list of clusters at a layer h.

The geo-fence service 112 computes a similarity user_sim $(u_i, u_j)$ between the two users across the entire hierarchy using a weighted sum of these layer-wise similarities. In one example, the geo-fence service 112 computers a user similarity with the following formula:

$$user\_sim(u_i, u_j) = \sum_{h=1}^{|H|} \beta(h) \times user\_sim_h(u_i, u_j). \quad (6)$$

In Equation (6), the term |H| represents the number of layers in the hierarchy. The term $\beta(h)$ represents a weight assigned to the layer, where the weight assigned to the layer corresponds to the level in the hierarchy (e.g., increasing weight as the level increases).

In this example, the geo-fence service 112 uses the user similarities and intrinsic affinities to compute a user-similarity-based affinity $\mathcal{A}_{us}(u, p, l)$ of a user u as a weighted average of the intrinsic affinities, where the similarity scores are used as the weights. The geo-fence service 112 performs this computation for a set of users u∈U and a set of locations l∈L. An example of a formula for computing the user-similarity-based affinity of a user u is:

$$\mathcal{A}_{us}(u, p, l) \triangleq \frac{\Sigma_{u' \in u} user\_sim(u, u') * \mathcal{A}_{int}(u', p, l)}{\Sigma_{u' \in u} user_{sim}(u, u')}. \quad (7)$$

Returning to FIG. 4, at block 406, the process 400 involves computing, for the particular user, a location-specific affinity from the user-similarity-based affinity and a weighted sum of additional user-similarity-based affinities for similar geographical locations. A processing device executes the geo-fence service 112 or other program code to implement block 406. In one example, the program code for the geo-fence service 112, which is stored in a non-transitory computer-readable medium, is executed by one or more processing devices. Executing the geo-fence service 112 causes the processing device to perform one or more of the following operations.

The geo-fence service 112 computes the location-specific affinity for recommending or otherwise designing geo-fences. The geo-fence service 112 computes a location-specific affinity that facilitates designing geo-fences in an area of interest that is discretized into set $\mathcal{G}$ of grid squares. The geo-fence service 112 defines a single value of affinity for a user u∈U in a grid square g∈G towards a product p∈P. To do so, the geo-fence service 112 uses the location semantics described above.

For example, each location is a stay point having some area, for which a semantic representation (e.g., a semantic vector) is computed by the geo-fence service 112 as described above. The geo-fence service 112 also determines or otherwise obtains semantic representations for the grid squares g∈G. The geo-fence service 112 uses Equation (3) to identify locations in the dataset having semantics similar to a particular grid square. The geo-fence service 112 uses the affinity for that location to estimate the affinity of the grid square. In this manner, the geo-fence service 112 can estimate affinities in grid squares even if no interaction data (or an insufficient amount of interaction data) is accessible by the geo-fence service 112.

The geo-fence service 112 constrains the search for semantically similar locations for each grid square is constrained to the set $\mathcal{L}'$. This constraint allows the affinity of an area to be affected by affinities in locations that are not inside the area. Allowing the affinity of an area to be affected by affinities in locations that are not inside the area reduces the likelihood of undesirable behavior in the model, e.g., the affinity capturing only local behaviors. The geo-fence service 112 selects a set of n semantically similar locations. Selecting the set of semantically similar locations enables a processing device, which may be unable to iterate over an entire large set $\mathcal{L}'$ of locations, to compute the affinity for a grid square. For each grid square g∈G, the set of top n similar locations are denoted by t(g), and the cardinality of the set is n.

The geo-fence service 112 computes a location-specific affinity for a given grid square g using, for example, the following equation:

$$\mathcal{A}_{sem}(u, p, g) \triangleq \frac{(\Sigma_{l' \in t(g)} sim_{loc}(g, l') * \mathcal{A}_{us}(u, p, l')) + (\Sigma_{l \in \mathcal{M}(g)} \mathcal{A}_{us}(u, p, l))}{(\Sigma_{l' \in t(g)} sim_{loc}(g, l')) + |\mathcal{M}(g)|}. \quad (8)$$

In Equation (8), the term $sim_{loc}(g,l')$ represents a semantic similarity between grid g and a location l' using Equation (3). The term $\mathcal{A}_{us}(u, p, l')$ is computed by the geo-fence service 112 using Equation (7). The denominator in Equation (8) contains the term $\mathcal{M}(g)|$. For all locations, l∈M(g), where g∈G, and $sim_{loc}(g,l')$ is 1, since l is positioned within the grid square g.

The geo-fence service 112 computes or otherwise obtains an affinity distribution $A(u,p) \in [0,1]^{|\mathcal{G}|}$ by collecting values of $\mathcal{A}_{sem}(u, p, g)$ for multiple grid squares g∈G in an area of interest. The term $\mathcal{A}$ (u, p) is the location-specific affinity for the user u towards product p.

Examples of Algorithms for User Segmentation and Associated Geo-Fence Design

The geo-fence service 112 uses the computed location-specific affinity vectors for identifying a set of user segments and creating a separate geo-fence for each user segment. To do so, the geo-fence service 112 executes a suitable algorithm to identify the user segments for a particular product. The algorithm receives, as an input, a set G of grid squares, a set U of users, and a set A of location-specific affinity vectors for the users and products, where each product p∈P. The algorithm performs K-means clustering, where each user is represented by the user's location-specific affinity vector A(u, p) for a product p. The geo-fence service 112 clusters similar location-specific affinity vectors.

The geo-fence service 112 iteratively performs the clustering using different values of K. The geo-fence service 112 selects the set of clusters corresponding to an iteration that provides a maximum CH value or other optimal CH value. Doing so can, for example, minimize intra-cluster distance and maximize inter-cluster distance. An example of using a CH value in this manner is described in Caliniski et al., "A Dendrite Method for Cluster Analysis," *Communications in Statistics-theory and Methods*, 3.1 (1974): 1-27, which is incorporated by reference herein. The output of the algorithm is a set UserSeg(p) of user segments for the product p. The geo-fence service 112 outputs a recommended geo-fence design for one or more of the user segments in the set UserSeg(p), where each user segment is given a separate geo-fence design. The geo-fence service 112 computes the average affinity distribution for each user segment, $\mathcal{A}_{avg}$ (p,user_seg). The average affinity distribution is used as the modeled location-specific affinities for a particular user segment, as described above with respect to FIG. 3. The geo-fence service 112 outputs a set $\mathcal{A}_{avg}$(p) of the average location-specific affinities for the user segments.

One example of an algorithm executed by the geo-fence service to perform segmentation is provided below:

```
max_ch_val := 0.0 // Holds max. CH-value obtained
k_optimal := 0 // Holds k that gives max. CH-value
UserSeg(p) := {} // user segments at k_optimal
for all k = 1 to |U| do
    // Perform K-Means Clustering
    ch_k, user_seg ← K – Means(A, U, p, k)
    if ch_k > max_ch_val then
        max_ch_val ← ch_k
        k_optimal ← k
        UserSeg(p) ← user_seg
    end if
end for
// Calculate average affinity distribution for user segments
for all user_seg ∈ UserSeg(p) do
    for all g ∈ G do
```

$$A_{avg}(p, user\_seg, g) = \frac{\sum_{u \in user\_seg} A(u, p, g)}{|user\_seg|}$$

```
    end for
end for
return UserSeg(p), 𝒜_avg (p)
```

The geo-fence service 112 executes another suitable algorithm to generate recommended geo-fence designs (i.e., to implement block 304 of the process 300). For each user segment, the geo-fence service 112 selects some or all grid squares from the average affinity distribution having affinities above a certain affinity threshold. The geo-fence service 112 clusters nearby grid squares. The geo-fence service 112 creates a boundary around each of the clusters to determine a group of geo-fences defined by the boundaries.

Clustering of grid squares having high affinity (e.g., greater than a threshold affinity thresh) can cause an area covered by a given geo-fence to be sufficiently large. A sufficiently large geo-fence allows the geo-fence to be used for achieving a desired purpose, i.e., assisting retailers, marketers, or other entities to provide personalized, targeted communications to relevant customer, end users, or other recipients. In some embodiments, the geo-fence service 112 uses the DBSCAN algorithm for clustering. Using the DBSCAN algorithm allows for arbitrarily shaped clusters to be generated. Examples of the DBSCAN algorithm are described in M. Ester et al., "A density-based algorithm for discovering clusters in large spatial databases with noise," Kdd, volume 96, pages 226-231, 1996, incorporated by reference herein.

The DBSCAN clustering generates clusters of grid squares. The geo-fence service 112 performs cluster polygonization to obtain closed polygons for each of the clusters and each of these polygons, thereby enclosing a set of grid squares. An enclosed polygon indicates a desirable geo-fence for the users of a particular user segment to which the clustered grid squares correspond. Any suitable cluster-boundary detection algorithm and polygon-construction algorithm may be used. Examples of such algorithms are described in H. Edelsbrunner et al., "On the shape of a set of points in the plane," *IEEE Transactions on Information Theory*, 29(4):551-559, 1983; I. Lee et al., "Polygonization of point clusters through cluster boundary extraction for geographical data mining," *Advances in Spatial Data Handling*, pages 27-40, Springer, 2002; and S. Li et al., "Quick geo-fencing using trajectory partitioning and boundary simplification," *Proceedings of the 21st ACM SIGSPATIAL International Conference on Advances in Geographic Information Systems*, pages 580-583, ACM, 2013. Each of these publications is incorporated by reference herein. An example of such an algorithm is the a-hull approach. The output of the geo-fence creation algorithm is a set of recommended geo-fence designs for geo-fences that will be positioned inside the area of interest. The set of geo-fence designs are referred to as location-sensitive, product-affinity-based geo-fences.

An example of a suitable geo-fence creation algorithm used by the geo-fence service 112 is the following:

```
Input: Set G of grid squares, set UserSeg(p) of user segments, set 𝒜_avg (p)
of average location-specific affinity's, a product p ∈ P, and an affinity
threshold thresh
Output: Set GeoFence(p) of geo-fence designs for each
user segment of the product p for all user_seg ∈ UserSeg(p) do
    // Find of grids having average affinity greater than thresh
    grid_set := { }
    for all g ∈ G do
        if 𝒜_avg (p,user_seg,g) > thresh then
            grid_set ← grid_set ∪ {g}
        end if
    end for // DBSCAN Clustering
    grid_clusters ← DBSCAN(grid_set)
    Geofence(p,user_seg) := { }
    for all clust ∈ grid_clusters do
        // Create boundary around each cluster of grids to form geo-fence
        geo_fence ← α — hull(cluster)
        Geofence(p,user_seg) ← Geofence(p,user_seg) ∪ geo_fence
    end for
end for
return Geofence(p)
```

Example of a Computing System for Personalizing Geo-Fences

Figure 8:
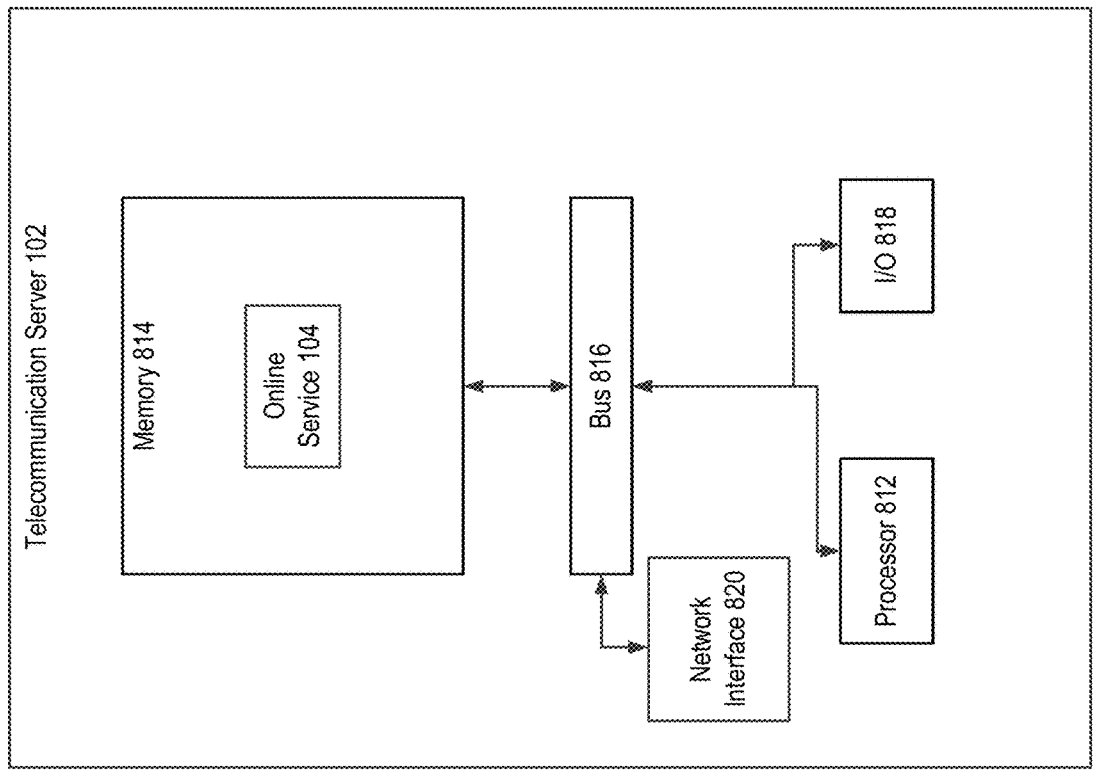
FIG. 8 depicts an example of a computing system that performs certain operations described herein, according to certain embodiments of the present disclosure.
Figure 8:
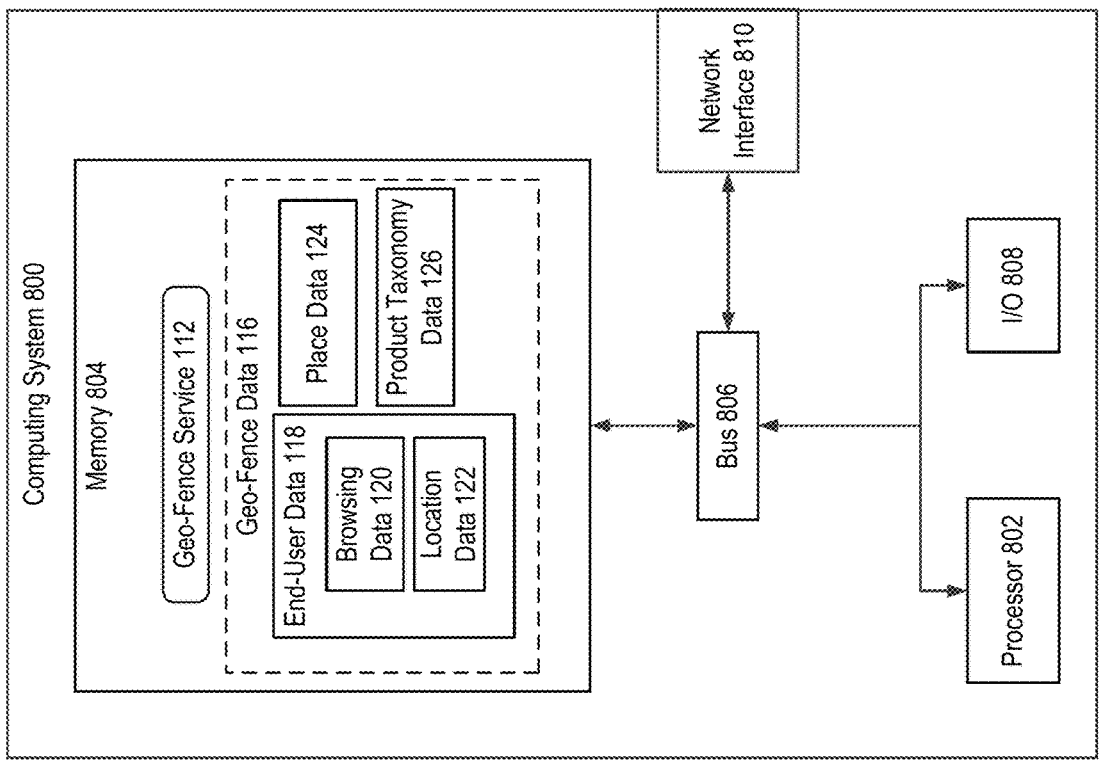

Any suitable computing system or group of computing systems can be used for performing the operations described herein. For example, FIG. 8 is a block diagram depicting an example of a computing system 800 (e.g., a marketing apparatus 110) that executes a geo-fence service 112 for generating personalized geo-fences, according to certain embodiments.

The depicted example of the computing system 800 includes one or more processors 802 communicatively coupled to one or more memory devices 804. The processor 802 executes computer-executable program code stored in the memory device 804, accesses information stored in the memory device 804, or both. Examples of the processor 802 include a microprocessor, an application-specific integrated circuit ("ASIC"), a field-programmable gate array ("FPGA"), or any other suitable processing device. The processor 802 can include any number of processing devices, including one.

The memory device 804 includes any suitable non-transitory computer-readable medium for storing the geo-fence service 112 and associated geo-fence data 116. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The computing system 800 may also include a number of external or internal devices such as input or output devices. For example, the computing system 800 is shown with an input/output ("I/O") interface 808 that can receive input from input devices or provide output to output devices. A bus 806 can also be included in the computing system 800. The bus 806 can communicatively couple one or more components of the computing system 800.

The computing system 800 executes program code that configures the processor 802 to perform one or more of the operations described above with respect to FIGS. 1-7. The program code includes, for example, the geo-fence service 112 or other suitable applications that perform one or more operations described herein. The program code may be resident in the memory device 804 or any suitable computer-readable medium and may be executed by the processor 802 or any other suitable processor. In some embodiments, the program code described above is stored in the memory device 804, as depicted in FIG. 8. In additional or alternative embodiments, the program code described above is stored in one or more memory devices accessible via a data network.

The computing system 800 can access the geo-fence data 116 in any suitable manner. In some embodiments, some or all of the geo-fence data 116 is stored in the memory device 804, as in the example depicted in FIG. 8. In additional or alternative embodiments, some or all of the geo-fence data 116 is stored in one or more memory devices accessible via a data network.

The computing system 800 also includes at least one network interface 810. The network interface 810 includes any device or group of devices suitable for establishing a wired or wireless data connection to one or more data networks. Non-limiting examples of the network interface 810 include an Ethernet network adapter, a modem, and/or the like. The computing system 800 is able to communicate with one or more other computing devices via a data network using the network interface 810.

FIG. 8 also depicts an example of a telecommunication server 102 that executes an online service 104. In some embodiments, the computing system 800 and the telecommunication server 102 are separate systems or devices. In additional or alternative embodiments, the same computing system or computing device can execute both the geo-fence service 112 and the online service 104 in accordance with the examples described herein.

The depicted example of the telecommunication server 102 includes one or more processors 812 communicatively coupled to one or more memory devices 814. The processor 812 executes computer-executable program code stored in the memory device 814, accesses information stored in the memory device 814, or both. Examples of the processor 812 include a microprocessor, an application-specific integrated circuit ("ASIC"), a field-programmable gate array ("FPGA"), or any other suitable processing device. The processor 812 can include any number of processing devices, including one.

The memory device 814 includes any suitable non-transitory computer-readable medium for storing the online service 104. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The telecommunication server 102 may also include a number of external or internal devices such as input or output devices. For example, the telecommunication server 102 is shown with an input/output ("I/O") interface 818 that can receive input from input devices or provide output to output devices. A bus 816 can also be included in the telecommunication server 102. The bus 816 can communicatively couple one or more components of the telecommunication server 102.

The telecommunication server 102 executes program code that configures the processor 812 to perform one or more of the operations described above with respect to FIGS. 1-10. The program code includes, for example, the online service 104 or other suitable applications that perform one or more operations described herein. The program code may be resident in the memory device 814 or any suitable computer-readable medium and may be executed by the processor 812 or any other suitable processor. In some embodiments, the program code described above is stored in the memory device 814, as depicted in FIG. 8. In additional or alternative embodiments, the program code described above is stored in one or more memory devices accessible via a data network.

The telecommunication server 102 also includes at least one network interface 820. The network interface 820 includes any device or group of devices suitable for establishing a wired or wireless data connection to one or more data networks. Non-limiting examples of the network interface 820 include an Ethernet network adapter, a modem, and/or the like. The telecommunication server 102 is able to communicate with one or more other computing devices via a data network using the network interface 820.

General Considerations

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, or additions to the present subject matter as would be readily apparent to one of ordinary skill in the art. Indeed, the methods and systems described herein may be embodied in a variety of other forms; furthermore, various omissions, substitutions, and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying," or the like, refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, or steps. Thus, such conditional language is not generally intended to imply that features, elements, or steps are in any way required for one or more examples or that one or more examples necessarily include logic for deciding, with or without author input or prompting, whether these features, elements or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or arranged compared to the disclosed examples.

The invention claimed is:

1. A computer-implemented method for generating personalized geo-fences that customize electronic communications with mobile devices, the computer-implemented method comprising:

determining, by a processor and from a set of taxonomy data defining a common characteristic of a set of similar products, cosine similarities between a product at a particular geographical location and additional products;

computing, by the processor, an intrinsic affinity of a particular user for the product from a weighted browse-count sum of (i) a browse count for the product and (ii) additional browse counts for the additional products, respectively, wherein each weight in the weighted browse-count sum indicates a respective cosine similarity between the product and a respective additional product, computing, by the processor, a user-similarity-based affinity based on:

semantic vectors for geographic locations, wherein a semantic vector includes a plurality of dimensions respectively representing types of places located within a threshold distance of a geographic location and, wherein each dimension from the plurality of dimensions has a respective value representing a respective number of places having a respective type represented by the dimension, and the intrinsic affinity of the particular user for the product, designing, by the processor and based on the user-similarity-based affinity, a geo-fence targeted to the particular user such that a message is transmitted to a user device of the particular user in response to an indication that the particular user is within a boundary of the geo-fence, the geo-fence defining a geographical area that includes the particular geographical location and that is associated with a provider of the product; and causing, by the processor, a telecommunication server to transmit the message to the user device when the user device is positioned within the designed geo-fence.

2. The computer-implemented method of claim 1, wherein the geo-fence is designed based on a location-specific affinity determined from the user-similarity-based affinity, wherein the method further comprises determining the location-specific affinity by, at least:

computing the user-similarity-based affinity for the particular user from a weighted sum of intrinsic affinities for a set of users, wherein each weight of the weighted sum of the intrinsic affinities indicates a respective similarity between the particular user and a respective one of the users; and computing the location-specific affinity from the user-similarity-based affinity and a weighted sum of additional user-similarity-based affinities for additional geographical locations wherein each weight of the weighted sum of the additional user-similarity-based affinities indicates a respective similarity between the particular geographical location and a respective one of the additional geographical locations.

3. The method of claim 1, wherein the processor computes the user-similarity-based affinity by performing operations comprising:

generating a multi-layer hierarchy of clusters of the semantic vectors, wherein each layer of the multi-layer hierarchy includes a respective set of clusters of the semantic vectors; and computing similarities between the particular user and users from a set of users, respectively, wherein computing each similarity comprises, for each user:

determining layer similarities between the user and the particular user based on the sets of clusters, respectively, and determining the similarity between the user and the particular user based on a weighted sum of the layer similarities.

4. The method of claim 2, wherein the processor further computes the location-specific affinity by computing each similarity between the particular geographical location and respective one of the additional geographical locations by computing a respective cosine similarity between a respective pair of semantic vectors representing the particular geographical location and the respective one of the additional geographical locations.

5. The method of claim 1, wherein designing the geo-fence targeted to the particular user comprises:

computing, for the particular user, modeled location-specific affinities for geographical locations, respectively;

selecting a subset of particular geographical locations based on each selected geographical location having a respective modeled location-specific affinity greater than a threshold affinity;

grouping the subset of the particular geographical locations into clusters; and deriving the geo-fence from a boundary around a cluster including the particular geographical location.

6. The method of claim 5, wherein computing the modeled location-specific affinities for geographical locations comprises:

computing location-specific affinity vectors for the geographical locations and a set of users including the particular user, wherein each location-specific affinity vector comprises, for a respective one of the users, a respective distribution of location-specific affinities across the geographical locations;

segmenting the set of users by grouping the location-specific affinity vectors into location-specific affinity clusters, wherein the location-specific affinity clusters define respective segments of the users;

averaging, for a segment corresponding to the particular user, distributions of location-specific affinities in a location-specific affinity cluster corresponding to the segment; and selecting the averaged distribution of location-specific affinities as the modeled location-specific affinities for the particular user.

7. The method of claim 1, wherein stored user information used to compute the intrinsic affinity comprises:

a user browsing history generated from interactions by the user device with an online service providing access to the product; and locations tracked by a global positioning system of the user device and associated with the interactions.

8. A non-transitory computer-readable medium embodying program code that, when executed by a processing device, cause the processing device to perform operations comprising:

determining, from a set of taxonomy data defining a common characteristic of a set of similar products, cosine similarities between a product at a particular geographical location and additional products;

computing an intrinsic affinity of a particular user for the product from a weighted browse-count sum of (i) a browse count for the product and (ii) additional browse counts for the additional products, respectively, wherein each weight in the weighted browse-count sum indicates a respective cosine similarity between the product and a respective additional product, computing a user-similarity-based affinity based on:

semantic vectors for geographic locations, wherein a semantic vector includes a plurality of dimensions respectively representing types of places located within a threshold distance of a geographic location and, wherein each dimension from the plurality of dimensions has a respective value representing a respective number of places having a respective type represented by the dimension, and the intrinsic affinity of the particular user for the product, designing, based on the user-similarity-based affinity, a geo-fence targeted to the particular user such that a message is transmitted to a user device of the particular user in response to an indication that the particular user is within a boundary of the geo-fence, the geo-fence defining a geographical area that includes the particular geographical location and that is associated with a provider of the product; and causing a telecommunication server to transmit the message to the user device when the user device is positioned within the designed geo-fence.

9. The non-transitory computer-readable medium of claim 8, wherein the geo-fence is designed based on a location-specific affinity determined from the user-similarity-based affinity, wherein the operations further comprise determining the location-specific affinity by, at least:
computing the user-similarity-based affinity for the particular user from a weighted sum of intrinsic affinities for a set of users, wherein each weight of the weighted sum of the intrinsic affinities indicates a respective similarity between the particular user and a respective one of the users; and
computing the location-specific affinity from the user-similarity-based affinity and a weighted sum of additional user-similarity-based affinities for additional geographical locations wherein each weight of the weighted sum of the additional user-similarity-based affinities indicates a respective similarity between the particular geographical location and a respective one of the additional geographical locations.

10. The non-transitory computer-readable medium of claim 8, wherein the user-similarity-based affinity is computed by performing operations comprising:
generating a multi-layer hierarchy of clusters of the semantic vectors, wherein each layer of the multi-layer hierarchy includes a respective set of clusters of the semantic vectors; and
computing similarities between the particular user and users from a set of users, respectively, wherein computing each similarity comprises, for each user:
determining layer similarities between the user and the particular user based on the sets of clusters, respectively, and
determining the similarity between the user and the particular user based on a weighted sum of the layer similarities.

11. The non-transitory computer-readable medium of claim 9, wherein computing the location-specific affinity further comprises computing each similarity between the particular geographical location and respective one of the additional geographical locations by computing a respective cosine similarity between a respective pair of semantic vectors representing the particular geographical location and the respective one of the additional geographical locations.

12. The non-transitory computer-readable medium of claim 8, wherein designing the geo-fence targeted to the particular user comprises:
computing, for the particular user, modeled location-specific affinities for geographical locations, respectively, wherein computing the modeled location-specific affinities for geographical locations comprises:
computing location-specific affinity vectors for the geographical locations and a set of users including the particular user, wherein each location-specific affinity vector comprises, for a respective one of the users, a respective distribution of location-specific affinities across the geographical locations,
segmenting the set of users by grouping the location-specific affinity vectors into location-specific affinity clusters, wherein the location-specific affinity clusters define respective segments of the users,
averaging, for a segment corresponding to the particular user, distributions of location-specific affinities in a location-specific affinity cluster corresponding to the segment, and
selecting averaged distribution of location-specific affinities as the modeled location-specific affinities for the particular user;
selecting a subset of the particular geographical locations based on each selected geographical location having a respective modeled location-specific affinity greater than a threshold affinity;
grouping the subset of the particular geographical locations into clusters; and
deriving the geo-fence from a boundary around a cluster including the particular geographical location.

13. A computing system comprising:
a non-transitory computer-readable medium storing computer executable program instructions; and
processing hardware configured for executing the program instructions and thereby perform operations comprising:
determining, from a set of taxonomy data defining a common characteristic of a set of similar products, cosine similarities between a product at a particular geographical location and additional products;
computing an intrinsic affinity of a particular user for the product from a weighted browse-count sum of (i) a browse count for the product and (ii) additional browse counts for the additional products, respectively, wherein each weight in the weighted browse-count sum indicates a respective cosine similarity between the product and a respective additional product,
computing a user-similarity-based affinity based on:
(a) semantic vectors for geographic locations, wherein a semantic vector includes a plurality of dimensions respectively representing types of places located within a threshold distance of a geographic location and, wherein each dimension from the plurality of dimensions has a respective value representing a respective number of places having a respective type represented by the dimension, and
(b) the intrinsic affinity of the particular user for the product, and
designing, based on the user-similarity-based affinity, a geo-fence targeted to the particular user such that a message is transmitted to a user device of the particular user in response to an indication that the particular user is within a boundary of the geo-fence, the geo-fence defining a geographical area that includes the particular geographical location and that is associated with a provider of the product; and
a server configured for transmitting the message to the user device when the user device is positioned within the designed geo-fence.

14. The computing system of claim 13, wherein the geo-fence is designed based on a location-specific affinity determined from the user-similarity-based affinity, wherein the operations further comprise determining the location-specific affinity by, at least:
computing the user-similarity-based affinity for the particular user from a weighted sum of intrinsic affinities for a set of users, wherein each weight of the weighted sum of the intrinsic affinities indicates a respective similarity between the particular user and a respective one of the users; and
computing the location-specific affinity from the user-similarity-based affinity and a weighted sum of additional user-similarity-based affinities for additional geographical locations wherein each weight of the weighted sum of the additional user-similarity-based affinities indicates a respective similarity between the particular geographical location and a respective one of the additional geographical locations.

15. The computing system of claim 13, wherein the user-similarity-based affinity is computed by performing operations comprising:
   generating a multi-layer hierarchy of clusters of the semantic vectors, wherein each layer of the multi-layer hierarchy includes a respective set of clusters of the semantic vectors; and
   computing similarities between the particular user and users from a set of users, respectively, wherein computing each similarity comprises, for each user:
      determining layer similarities between the user and the particular user based on the sets of clusters, respectively, and
      determining the similarity between the user and the particular user based on a weighted sum of the layer similarities.

16. The computing system of claim 14, wherein computing the location-specific affinity further comprises computing each similarity between the particular geographical location and respective one of the additional geographical locations by computing a respective cosine similarity between a respective pair of semantic vectors representing the particular geographical location and the respective one of the additional geographical locations.

17. The computing system of claim 13, wherein designing the geo-fence targeted to the particular user comprises:

computing, for the particular user, modeled location-specific affinities for geographical locations, respectively, wherein computing the modeled location-specific affinities for geographical locations comprises:
   computing location-specific affinity vectors for the geographical locations and a set of users including the particular user, wherein each location-specific affinity vector comprises, for a respective one of the users, a respective distribution of location-specific affinities across the geographical locations,
   segmenting the set of users by grouping the location-specific affinity vectors into location-specific affinity clusters, wherein the location-specific affinity clusters define respective segments of the users,
   averaging, for a segment corresponding to the particular user, distributions of location-specific affinities in a location-specific affinity cluster corresponding to the segment, and
   selecting the averaged distribution of location-specific affinities as the modeled location-specific affinities for the particular user;
selecting a subset of particular geographical locations based on each selected geographical location having a respective modeled location-specific affinity greater than a threshold affinity;
grouping the subset of the particular geographical locations into clusters; and
deriving the geo-fence from a boundary around a cluster including the particular geographical location.

* * * * *